Sept. 11, 1956  G. P. BAFOUR ET AL  2,762,485
AUTOMATIC COMPOSING MACHINE
Filed March 21, 1955  11 Sheets-Sheet 1
FIG. 1
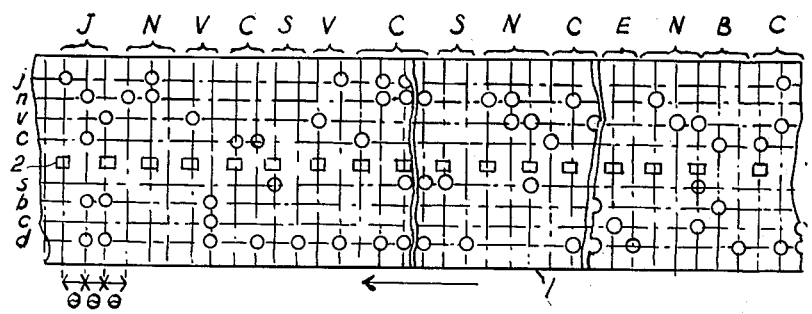
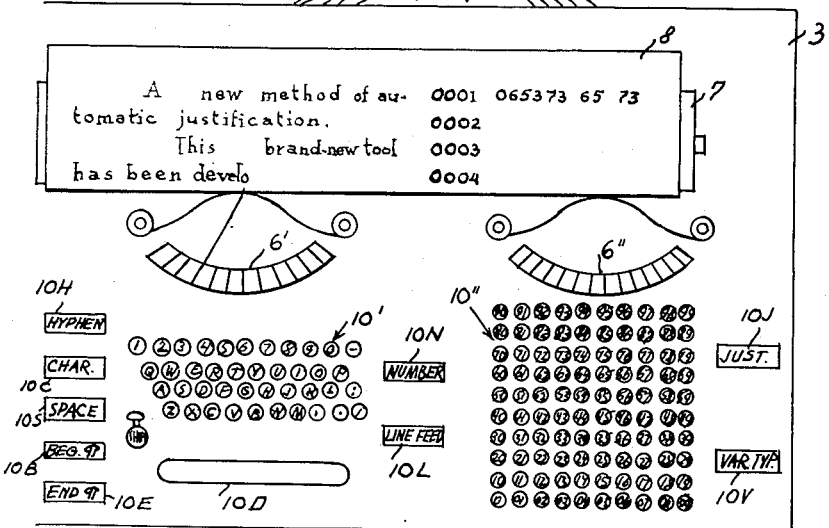
FIG. 2
INVENTORS:
Georges P. Bafour, André R. Blanchard,
François H. Raymond
BY John Michel
ATTORNEY

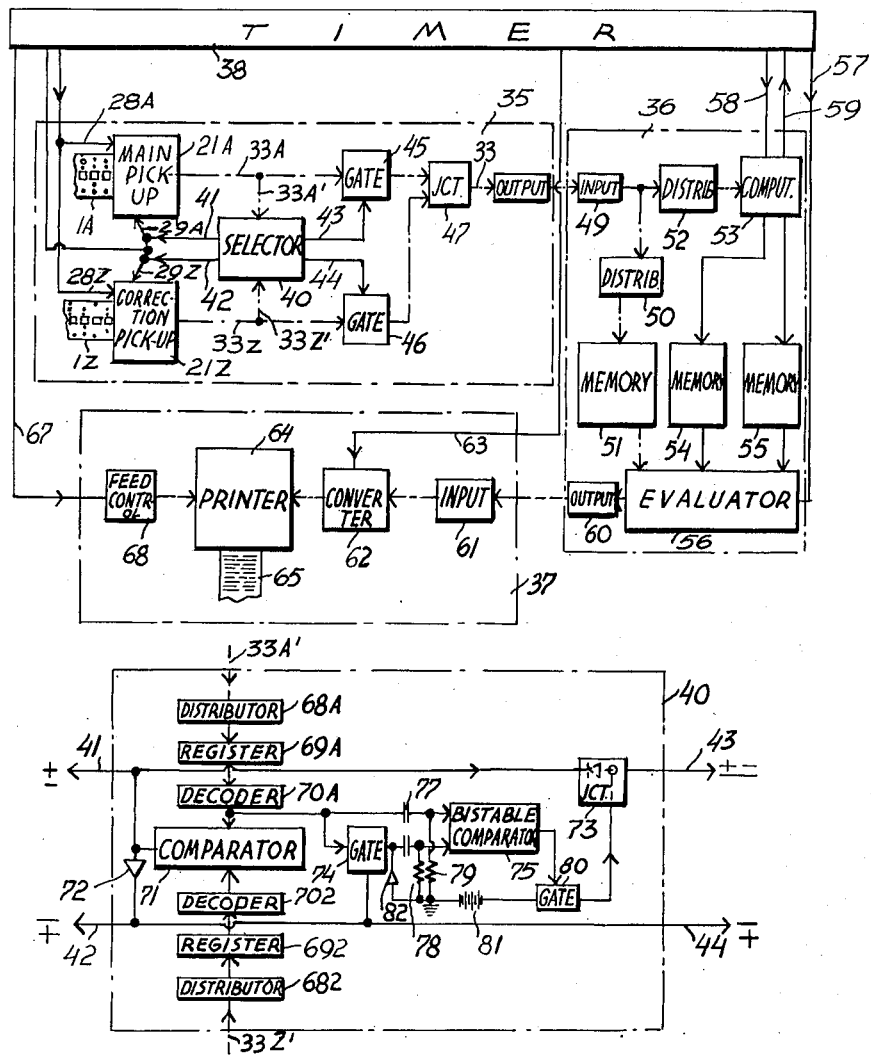

Sept. 11, 1956 G. P. BAFOUR ET AL 2,762,485
AUTOMATIC COMPOSING MACHINE
Filed March 21, 1955 11 Sheets-Sheet 5

| Fig. 10c | Fig. 10a |
| --- | --- |
| Fig. 10d | Fig. 10b |

INVENTORS:
Georges P. BAFOUR, André R. BLANCHARD
François H. RAYMOND
BY A. John Michel
ATTORNEY

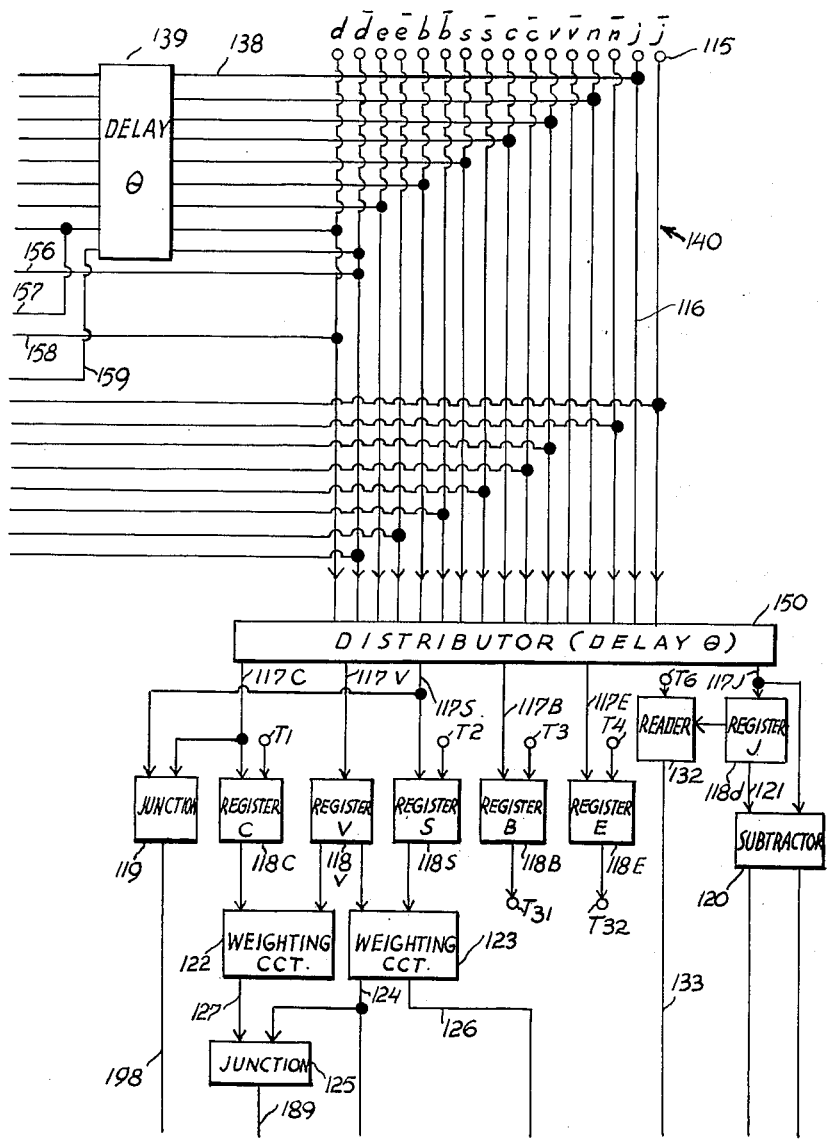

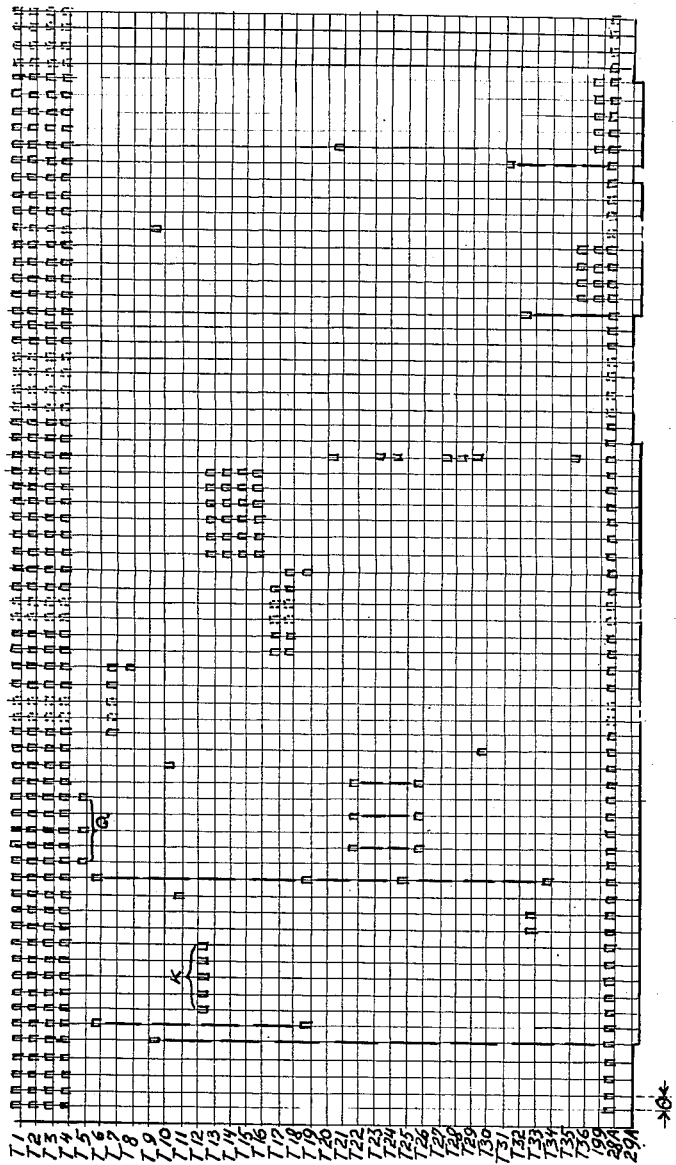

United States Patent Office 2,762,485
Patented Sept. 11, 1956

2,762,485
AUTOMATIC COMPOSING MACHINE

Georges P. Bafour and Andre R. Blanchard, Paris, and Francois H. Raymond, Saint-Germain-en-Laye, France Application March 21, 1955, Serial No. 495,830

Claims priority, application France March 24, 1954

41 Claims. (Cl. 197—20)

Our present invention relates to an automatic composing plant for printed texts.

The printing of texts involves a number of preparatory steps requiring to a large extent the services of a human operator. These steps usually include the transcription of an author's manuscript in typewritten form, for the purpose of producing a working copy for the compositor on which the latter, in addition to correcting typographic and grammatical errors, will enter a number of annotations for the printer such as the following:

(a) Indication of format and margins;
(b) Determination of justification;
(c) Determination of fonts or type faces for various passages of the text;
(d) Modification, if any, of paragraphs appearing on the typewritten copy;
(e) Indication of spaces to be left for cuts, tables and the like to appear in the body of the text;
(f) Arrangement of footnotes.

The so annotated copy is then handed to a printer who proceeds to set the type (automatically or by hand) or in some other manner, e. g. by a photographic process, prepares a matrix from which the text can be reproduced the desired number of times. The important steps in this operation may include the breakup of the lines and the justification of the margin in addition to the operations indicated by the compositor's annotations, at least some of these steps having hitherto required the intervention of the human mind.

One of the objects of the present invention is to provide means for automatically carrying out the two steps just referred to.

A more general object of this invention is to provide means for automatically performing a number of composing operations hitherto carried out manually and mentally.

A related object of our invention is to reduce the cost of reproduction of printed texts and to eliminate sources of human error by providing a substantially fully automatic composing plant.

Another object of the instant invention is to provide means for automatically preparing a matrix for reproduction purposes from a record adapted to be produced in simple manner from any legible manuscript.

It should be understood that the matrix herein referred to need not be in type but may take the form of an intermediate record (e. g. a perforated tape or a photographic film) adapted to control a type-setting machine in some manner known per se.

For the sake of convenience, any recorded item adapted to be read or scanned by automatic means (e. g. mechanically, electrically or optically) will be referred to as a "coded entry"; any recorded item adapted to be read directly, including arbitrary or special (e. g. stenographic) symbols, will be termed a "clear entry." Indications not germane to the text to be printed, such as the aforementioned compositor's annotations, will be referred to as "service informations."

An automatic composing plant according to the invention is primarily useful in a system in which the following operational steps, partly manual and partly automatic, are to be carried out:

(A) Registration of coded entries of text and service informations correlated with one another; this stage of operations may comprise one or more recording phases and may result in a single record containing both kinds of entry or in a separate record for each kind;

(B) Progressive conversion of these coded entries into electrical signals, again (according to the number of records) in a single operational phase or in two overlapping or alternating phases;

(C) Translation of the above signals into a pattern of variables (e. g. electrical potentials) defining the complete typographic makeup of a text to be produced by a manually or automatically operated type-setting machine;

(D) Retranslation of the aforementioned variables into coded entries for the control of an automatic or semi-automatic type-setting machine or into clear entries for the control of a machine operated by hand.

It will be understood that stage (A), above, may involve the recording of additional coded entries representing a proofreader's corrections as well as the necessary service informations relating thereto; these additional entries will then be converted in stage (B) into sets of electrical signals serving to cancel and to modify certain of the variables produced in stage (C). It will further be possible to produce a record of clear entries, for monitoring purposes, simultaneously with the preparation of the coded entries in stage (A) and also, if desired, to obtain parallel clear and coded records at the output of stage (D).

Thus, a system according to our invention comprises means for carrying out the registration, conversion, translation and retranslation set forth under (A), (B), (C) and (D) above, at least the means for effecting the three last-mentioned operations being substantially fully automatic.

Generally, the registration of coded entries in stage (A) will involve a human factor, especially with regard to service information and corrections of text. A feature of our invention resides in the adaptation of conventional keyboard machines (e. g. typewriters or teleprinters) for the recording of such entries in a most convenient and expeditious manner. A machine so modified comprises additional keys for the service entries, preferably together with means for (automatically or manually) consecutively numbering each line for purposes of correlating the original record with a second record bearing the necessary corrections. Evidently, such a machine could produce the original text and service entries on a single record or on two separate records; the former is preferable since it dispenses with the need for special means to correlate the two kinds of entries. The operator may use such machine in the same manner as a conventional typewriter, except that any carriage return either within a line or to a preceding line must be avoided and no corrections must be made in the principal text. The necessity for numbering each line may, however, be obviated in cases where, following the typing of each line together with the accompanying service informations, such line is immediately proofread and a cancellation signal is registered upon the discovery of any typing error, the line immediately succeeding them taking the place of the one so canceled.

Usually, then, and especially where a clearly legible manuscript is available on which the necessary annotations have already been entered by hand, it will be most convenient to prepare (with the aid of the aforementioned modified machine) a principal record of interleaved text and service entries in coded form, together with one or two monitoring tracks, such as sheets of paper, on which the same entries appear in clear form. The lines of the monitoring track are consecutively numbered, these numbers also appearing as service informations on the coded record. Should the original manuscript not have been neat enough for the compositor to work on, then a record containing only the coded text entries could have been made upon retyping, to be followed by a record of coded service entries (distributed over correspondingly numbered lines) after the compositor has completed his work on the retyped text copy. A further coded record, preferably together with an uncoded monitoring track, is prepared after proofreading; this record contains only the lines, identified by number, in which corrections of the principal record are required. Given a system of sufficiently large storage capacity, the substitution of corrected lines for original ones may be carried out by a device comparing the line-identifying numbers of two separately introduced records; more conveniently, though, the two records are inserted simultaneously, means being provided for advancing the correction record by one line whenever a corresponding line of the principal record has been reached.

The coded records so produced are then fed into the composing machine proper which may comprise an electric or electronic computer, e. g. one adapted in known manner to convert a set of data on an input tape into a result appearing in coded or in clear form on an output tape. The tasks of the computer include the evaluation of the incoming service informations for purposes of line breakup and justification, the suppression of certain of these service informations which are useful only for the determination of the justification, and the transmittal of the text and the remaining service informations to a manual or automatic type-setting device in a form in which the desired justification is assured by the presence of the necessary spacing between words and by the positive indication of the end of a line.

Known computers of the so-called "universal" or "general-purpose stored program" type may be adapted to the above-enumerated purposes with little more than a change in the memory units of their control circuits. Such computers have been described, for example, in Proceedings of the I. R. E., October 1953, page 1227.

An important, though not essential, additional feature of our invention resides in the provision of means for making a single record of coded text and service entries for use in a computer as set forth above, each entry comprising at least one code element (e. g. perforation) characteristic for a particular class of entries; this part of the entry will subsequently be referred to as its "flag portion." Following it is a set of code elements (one or more) in groupings which may be the same for entries in different classes and which more particularly define the individual members of the class characterized by the flag portion; this subsequent part of the entry will be termed the "signal portion." The various flag portions serve, in a manner more fully described hereinafter, to condition certain registers in the computer to accept or to reject the associated code portions. The flag portion of an entry may be common to a plurality of immediately consecutive entries of the same class and need not be repeated until an entry in a different class has intervened.

The invention will be explained in greater detail with reference to the accompanying drawing in which:

Fig. 1 illustrates part of a perforated tape bearing text and service informations coded in accordance with the invention;

Fig. 2 diagrammatically shows a keyboard-controlled recorder for producing the tape of Fig. 1;

Fig. 6 is an overall block diagram of a system for translating the code combinations on the tape of Fig. 1 into a printed text;

Fig. 7 is a more detailed circuit diagram of one of the elements shown in Fig. 6;

Figures 9, 10E:
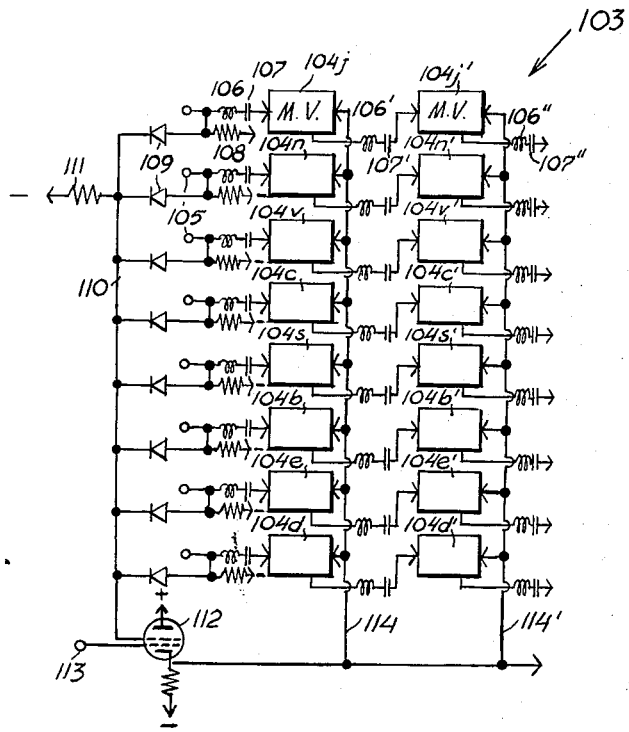
Fig. 9 is a circuit diagram similar to Fig. 8 but showing a multistage stepping register forming part of the computer stage of the translator of Fig. 6.
Figure 12:
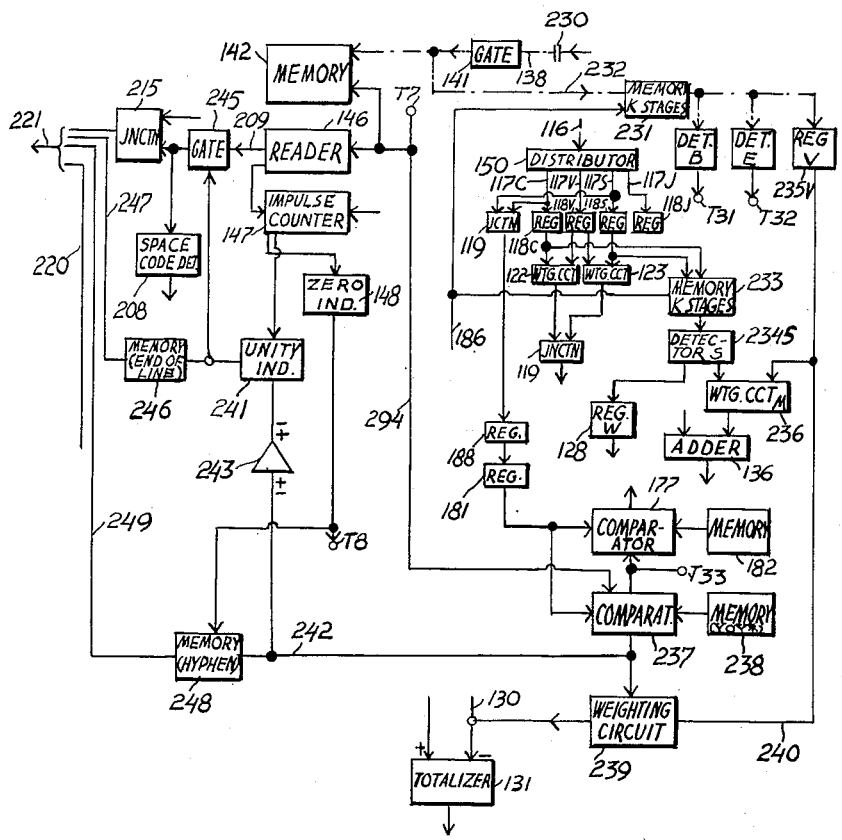

Figs. 10a, 10b, 10c and 10d, when arranged side-by-side as indicated in Fig. 10e, represent a more detailed circuit diagram of the computer stage of the translator;

Fig. 11 is a sequence chart illustrating the operation of a timer forming part of the translator of Fig. 6; and Fig. 12 shows a partial modification of the computer stage illustrated in Figs. 10a–10d.

In Fig. 1 there are shown different parts of a tape 1 carrying a series of coded entries each consisting of at least two consecutive transverse files of code elements, including text entries and service entries in random succession. Tape 1 is equally representative of an original record and of a correction record.

While the code elements have been illustrated as perforations, it will be understood that equivalent markings (produced, for example, electrolytically or photographically, by inking, or burning, by magnetic recording, etc.) may likewise be used. Means for registering and reading any such entries are well known.

The code illustrated by way of example is of the seven-element binary type. Tape 1 is also provided with the usual perforations 2 engageable by the teeth of a feed roller 21 (Fig. 3); the illustrated position of these perforations along the center line of the tape being, of course, not critical. Although a friction feed could also be used, the positive entrainment of the tape by one or more toothed rollers is preferred on account of the more precise synchronization obtainable.

The advance of the tape being assumed to take place from right to left as indicated by the arrow, the entries thereon are scanned from left to right. The time for passing from one file to the next during reading of the tape represents one unit interval and has been designated $\theta$.

The following classes of entries have been illustrated in Fig. 1:

J indicating justification
N indicating numbering of line
V indicating variety of type faces
C indicating character (letter, numeral, punctuation mark)
S indicating space between words
B indicating beginning of paragraph
E indicating end of paragraph The effective portion of tape 1 is shown divided into eight rows designated, in order, $j$, $n$, $v$, $c$, $s$, $b$, $e$ and $d$. The small letters identifying the first seven of these rows will be recognized as corresponding to the seven capital letters indicating the classes of entries just referred to. A single code element in any transverse file, if occupying one of these seven rows, constitutes the flag portion of an entry and characterizes it as falling within the class identified by the respective row. Thus, the first file of entry J contains a single hole in row $j$, that of entry N contains a single hole in row $n$, and so on. These same seven rows also carry the binary code elements in the signal portion of each entry; the eighth line, $d$, is reserved for a discriminating element serving to distinguish the entries of class N from all the others.

It will be appreciated that the number of rows on tape 1 may be reduced by eliminating, for example, rows $b$ and $e$ in which case the beginning and the end of a paragraph could be indicated by a special entry preceded by the flag C, or else by using a common flag ($b$ or $e$) for the beginning and the end of a paragraph and replacing the special space code S with a code included in class C. In that event the signal portion of each entry will be recorded in a five-element code.

With the seven-element code illustrated, each file can represent any of 128 different numerical values; codes J and N, for example, each have two files in their respective signal portions and may thus assume any value from 0 through 16,383. Codes S, B and E, however, have each only a single value indicated by one perforation (on row $d$) in the single file constituting their signal portion. Codes C and V, whose signal portions also contain but one file, each have 128 possible different values.

It will be noted that a perforation is present on row $d$ in each file of the signal portions of all the entries with the exception of code entries N, this being so for the purpose of enabling the computer to suppress the line numbering of the typed (or otherwise prepared) text supplied to it. The numbering of the lines may, of course, be re-started every 10,000 lines or so without inconvenience or confusion.

On the tape illustrated in Fig. 1 the first entry is a code J, indicating the particular numerical value selected for the justification of the following text. This value is conveniently expressed in terms of the number of unit spaces required to fill up a line of printed text of prescribed length. Usually, a code of this class will not be needed again until a new justification value is introduced, i. e. until the width of the printed text is to be changed.

The next code, N, indicates the beginning of a new line in the typewritten text; it is followed by a code V designating the variety of type faces to be used until the next such code occurs. Thereafter, a single character (e. g. a one-letter word) appears in the form of a code C, followed by a code S for a space. The illustrated presence of another code V following this code S indicates a change in type faces. Next, a single perforation on row $c$ introduces a series of codes C representing part of the message to be printed; there follows another space code S, which signifies the end of a typewritten line since it is followed immediately by a new line number code N. (If the line in the typewritten text had terminated in a hyphen occurring because of the separation of a word, this hyphen would have been suppressed by the machine described hereinafter and would have been replaced by a space code S.) After the number code N there occur again a succession of character entries C, followed by an end-of-paragraph entry E. Again, a code N announces the start of a new line, coincidentally with the beginning of a new paragraph as indicated by code B immediately thereafter. The body of this new paragraph again consists of an alternation of characters C and spaces S, interspersed with line numberings N, only the beginning of the first code series C having been illustrated.

It will be apparent from the foregoing description of tape 1 that the information recorded therein could also have been distributed over two separate tapes of similar appearance, one tape containing all the text entries, such as C and S, the other containing all the service informations such as J and V. Identical number codes N would have had to appear on both tapes for proper correlation. Indentation codes B and E could have been recorded on either tape. It will also be apparent that the text and service entries on tape 1, instead of being interleaved for each line as shown, might be rearranged so that all text entries (C, S) of one line appear grouped together and, following a repetition of the number code identifying such line, the service entries appertaining thereto (e. g. J, V) are similarly grouped. With such arrangement it would not be possible, of course, to indicate a change in type faces in the middle of a line as described in connection with Fig. 1.

Reference is now made to Fig. 2 for a schematic illustration of a typewriter 3 adapted to produce the tape 1 of Fig. 1 together with a clear record for monitoring purposes. This device may be considered as having been derived from a conventional (e. g. electric) typewriter by supplementing its normal keyboard 10' with a second keyboard 10" and providing leads 4', 4" extending from their respective keys toward a recorder 5 operating on the tape 1. It may equally be regarded as a modified teleprinter with extra keyboard and without the usual distributor-transmitter.

Keyboard 10' is similar to that of any ordinary typewriter, with the possible addition of supplemental keys for characters not normally needed in typewritten texts. Keyboard 10" is here shown to consist of 100 keys bearing the numbers 00 through 99, thus enabling the registration of any number from 0000 through 9999. There is also provided the usual space bar, designated 10D, a line feed key 10L and seven special keys 10J, 10N, 10V, 10C, 10S, 10B and 10E each corresponding to one of the seven codes previously discussed. A further special key 10H serves to type a hyphen when a word is divided at the end of the line, this key being distinct from the one of keyboard 10' (upper right) bearing the regular hyphen used in compound words and to be retained in the printed text.

Two sets of type bars 6', 6" are controlled by the keyboards 10' and 10", respectively. Each of these keys also controls in the usual manner the advance of carriage 7 and, in a manner to be described in connection with Fig. 3, the advance of record tape 1 as well as the perforation of entries therein constituting the signal portions of the multi-element codes J, N, V and C. Space bar 10D, when depressed, advances the carriage represented by roller 7 as well as the tape 2 and causes the punching of a perforation in row $d$ of the latter. Key 10H operates one of the type bars 6' to cause a hyphen to appear on the monitoring sheet 9 carried by roller 7; this key also actuates the line feed mechanism which rotates roller 7 by one line and returns the carriage to its extreme left-hand position. Key 10L operates only the line feed, without leaving a visible imprint on sheet 8. The effect of the last-mentioned key 10L upon tape 1 is the same as that of space bar 10, causing a mark to be impressed in row $d$. The remaining special keys, 10J, 10N, 10V, etc., have no effect upon roller 7 or type bars 6' 6" but merely serve to advance the tape by one step and to impress therein the single perforation constituting the flag portion of the corresponding code, thus, respectively, on row $j$, $n$, $v$, etc.

On sheet 8 there has been shown typewritten, by way of illustration, part of a text together with the pertinent service informations. The corresponding entries made simultaneously on tape 1 may be the same as those illustrated in Fig. 1, except that the relative position of the first two entries (J and N) has been interchanged in Fig. 2 to make all line numbers appear in the same column.

To prepare the message appearing on sheet 8 in Fig. 2, the operator proceeds as follows: With the carriage and roller 7 in its extreme right-hand position, she depresses key 10N to produce the flag portion of the first code N on tape 1, then successively operates keys "00" and "01" on right-hand keyboard 10" to type the number of the first line, 0001, in the central column of the sheet, corresponding perforations being simultaneously produced in two consecutive files of tape 1 to form the signal portion of the first entry. Next, she depresses key 10J to enter the flag portion of code J on tape 1, and successively operates keys "81" and "53" of keyboard 10" to register the justification value, assumed to be 0653, prescribed by the compositor. In similar manner, by the successive operation of keys 10V and "73," she registers the identification of the type faces, on both the monitoring sheet 8 and the record tape 1.

The operator thereupon turns to the left-hand keyboard 10′, depressing key 10C preparatorily to the typing of the first character ("A") of the text. It may be assumed that each of the two-digit keys on keyboard 10″ advances the roller 7 by two spaces, hence the first letter of the text will be indented by six spaces from the left-hand margin (disregarding the four spaces due to the typing of the line number, which are the same for each line and therefore are part of the margin). A look at the right-hand half of the sheet will show such indentation to be due to the registration of service information and not to the beginning of a paragraph; if this should be undesirable, the two halves of sheet 8 could be separated and mounted on independently movable carriages. The right-hand (service) half of the sheet might then be made transparent so that it can be laid over the left-hand (text) half for a convenient check of the correlation of the entries thereon.

Since the first letter of the text is to be followed by a space, the operator must next depress the key 10S before actuating the space bar 10D, thereby recording the flag portion of the space code on row $s$ of tape 1. It has been assumed that the next word ("new") requires a change in type faces, e. g. to italics or boldface, hence another actuation of key 10V followed by the operation of the appropriate two-digit key ("65") is indicated. These steps account for the recording of the second entry V (Fig. 1) on tape 1 and also advance the roller 7 by two extra spaces to the left.

The operator now again actuates key 10C, types the word "new," depresses key 10S and space bar 10D, and reverts to the original choice of type faces by re-operating key 10V and key "73." There follows a new actuation of key 10C, after which letters and spaces are typed in the manner described above. At the end of the line, since the division of a word is (assumedly) required, she operates key 10S followed by key 10H which types a hyphen and resets the carriage to the beginning of the next line.

After the carriage return, the operator actuates keys 10N, "00" and "02" to register the new line number, then proceeds with the typing of the words as before. Since this line has been assumed to constitute the end of a paragraph, the operator after typing the final period (.) actuates key 10E and, immediately thereafter, key 10L. The carriage is now positioned for the beginning of a new line which is again started by a numbering operation, followed by the actuation of keys 10B and 10D to enter the "beginning of paragraph" code B on tape 1 and to indent the new line by a fixed number of spaces.

This third line is assumed to contain a compound word ("brand-new") whose hyphen is to be preserved in the text to be printed; this hyphen, accordingly, is produced in the usual manner by one of the keys of keyboard 10′ and not by key 10H. After writing the last word ("tool"), the operator depresses keys 10S and 10L for another carriage return and proceeds to work on the next line in the manner previously described.

The machine shown in Fig. 2 requires the successive operation of two key members, e. g. 10S and 10D, for each of a variety of operations such as spacing, indentation, hyphenation and line feed. This is somewhat cumbersome and has been described principally to further the understanding of the correlation between the typewritten characters appearing on sheet 8 and the perforated entries on tape 1. It will be plain, however, that space bar 10D can be wired (e. g. with the aid of slow-operating relays in cascade, see Fig. 4) to cause two successive advances of tape 1 along with the punching of the proper perforation (in rows $s$ and $d$, respectively) upon each such advance, and that the connections of keys 10H, 10L, 10B and 10E can be similarly modified, whereby key 10S becomes redundant and the aforementioned operations are simplified. In like manner each key of keyboard 10′ could be wired to preface each character code C with its own flag portion (perforation on row $c$), whereupon key 10C could also be omitted.

Although the keyboard 10″ has been shown provided with 100 keys, it will be understood that this number could be increased to 128 with a seven-element code as illustrated in Fig. 1; this, however, would require some three-digit keys to be included, which may not be very practical. The actual number of keys in this keyboard could, of course, be halved by the provision of the usual shift key, e. g. as shown in connection with keyboard 10′.

It may also be mentioned that the two sets of type bars 6′, 6″, could be consolidated into a single set, each of the keys in keyboard 10″ when operated causing the roller 7 to rotate by half a line spacing (e. g. with the aid of a simple pawl-and-ratchet mechanism electromagnetically controlled from this keyboard) so that the service informations will appear interleaved with the text.

Furthermore, the numbering of the successive lines on sheet 8 may be automatic under the control of a counting device (not shown) responsive to the actuation of key 10H or 10L and adapted to operate the proper keys of keyboard 10″. In such event the numbering key 10N would be used only in the preparation of the correction sheet and tape, at which time the automatic counter would have to be inactivated since the line numbers there do not run consecutively.

Figure 3:
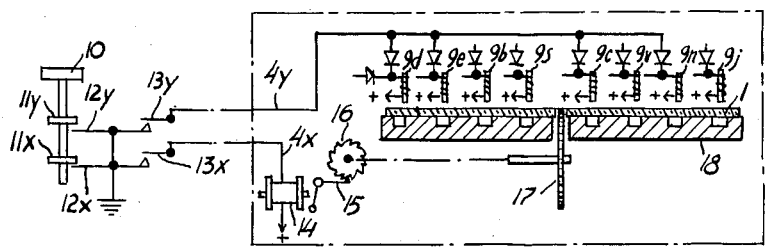
Fig. 3 is a circuit diagram illustrating the operation of the recorder of Fig. 2.

The key 10, Fig. 3, is representative of any of the keys 10′, 10″, 10J etc. (including space bar 10D) shown in Fig. 2. Its stem carries a pair of collars $11x$, $11y$ adapted to engage, respectively, a pair of pivoted contact levers $12x$, $12y$ co-operating with contact springs $13x$, $13y$. It should be noted that contacts $12x$, $13x$ make before and break after contacts $12y$, $13y$. Spring $13x$ is connected to a wire $4x$, representative of one of the leads 4′, 4″ in Fig. 2, which is connected to potential (+) through the winding of a stepping magnet 14. The armature of magnet 14 carries a pawl 15 which, whenever the magnet releases its armature, advances a ratchet 16 coupled to the shaft of a sprocket 17 whose teeth engage the perforations 2 of table 1. Poised above this tape, and in line with corresponding recesses in a support 18 for the tape, are eight solenoid-controlled perforators $9j$, $9n$, $9v$, $9c$, $9s$, $9b$, $9e$, $9d$, whose positions define the eight rows $j$, $n$, $v$ etc. of Fig. 1. One or more of these solenoids are connected to the contact spring $13y$ of each key 10 by way of a wire $4y$ and respective rectifiers required for mutual insulation of the multipled energizing circuits. The feed mechanism 14–17 and the perforators $9j$, $9n$ etc. all form part of the recorder 5 shown in Fig. 2.

When the key 10 is depressed, contacts $12x$, $13x$ close and energize magnet 14 which attracts its armature without, however, advancing 16 at this time. Immediately thereafter, contacts $12y$, $13y$ are closed and complete the circuit for their associated solenoids (here those of perforators $9d$, $9e$, $9c$ and $9n$) which cause the tape 1 to be perforated in the corresponding positions. As the key 10 is released, contacts $12y$, $13y$ and $12x$, $13x$ open in short succession, the actuated perforators are retracted and the magnet 14 is de-energized, thereby moving the tape 1 ahead by the distance between two files.

Figure 4:
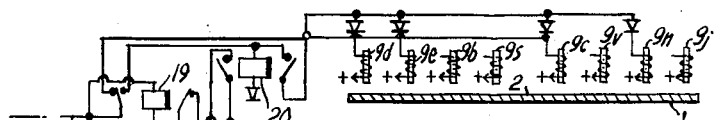
Fig. 4 is a modification of the circuit arrangement of Fig. 3.

In Fig. 4 a modified recorder circuit has been shown in which the wire $4x$ is connected to the winding of magnet 14 not directly but through contacts of two slow-operating relays, namely through a break contact of a relay 19 and, in parallel therewith, through a make contact of a relay 20. Relay 19, whose winding is connected between battery and wire $4y$, has a second armature whose back contact normally extends wire $4y$ to one of the solenoids associated with tape 1 (here that of perforator $9c$); when relay 19 is operated this armature by way of its front contact extends wire $4y$ to the winding of relay 20 which, through a further armature and front contact of its own, extends wire $4y$ to a single one or a combination of these solenoids (here those of the same perforators 9d, 9e, 9c and 9n as in Fig. 3).

When the key associated with wires 4x and 4y in Fig. 4 is depressed, magnet 14 is energized over the right-hand armature and back contact of relay 19, and perforator 9c is actuated to punch a hole in the c position of the tape. Shortly thereafter, relay 19 operates and breaks the energizing circuit of perforator 9c and magnet 14, the latter having just enough inertia to release its armature after the perforator has had time to withdraw from the tape. Tape 1 is thus advanced one step. Relay 19, in operating, also completed the energizing circuit for relay 20 which attracts its armatures shortly after the stepping of the tape, thereby re-operating magnet 14 and completing the circuits for perforators 9d, 9e, 9c and 9n which pierce the tape and are withdrawn upon the release of the tape, following which the tape advances one more step as the magnet 14 is one more de-energized. It will thus be seen that with the arrangement of Fig. 4 a single key combines the functions of a flag key, such as 10C, and a character key, such as 10', or of a combination of a flag (e. g. 10S or 10B) and the space bar (10D), all as described in connection with Fig. 2.

Figure 5:
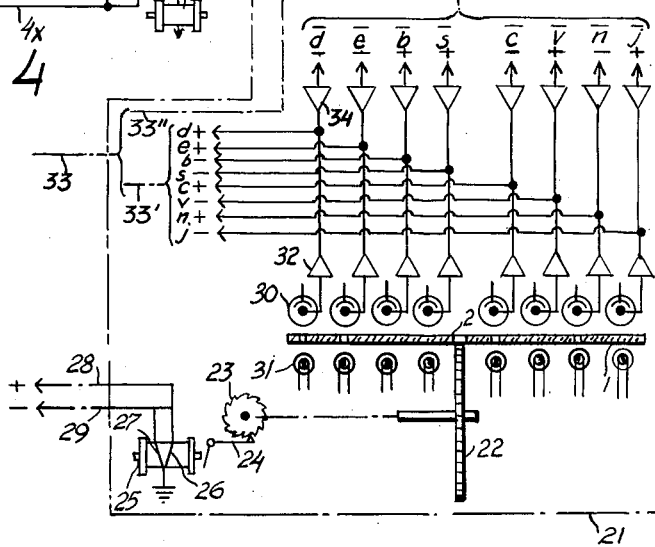
Fig. 5 is a circuit diagram of a pick-up device adapted to read the coded informations on the tape of Fig. 1.

In Fig. 5 we have shown a pick-up head, generally designated 21, serving to translate the codes on tape 1 into electrical impulses capable of being evaluated by an electronic computer. It comprises a sprocket wheel 22, driven from a ratchet 23, which engages the perforations 2 of tape 1 for a step-by-step advance under the control of a pawl 24 coupled with the armature of a stepping magnet 25. This magnet has a first or operating winding 26 and a second or blocking winding 27. The conductors feeding these two windings, leading to sources of operating (assumedly positive) and blocking (assumedly negative) potential, respectively, have been designated 28 and 29.

Eight photocells 30, positioned on either side of sprocket 22, are excitable by corresponding lamps 31 as perforations appear in their respective positions on the tape 1 separating the photocells from the lamps. The output electrode (anode) of each photocell 30 is applied over a first amplifier-inverter 32 to a respective one of eight leads collectively designated 33' and over a second amplifier-inverter 34, in cascade with the first, to a respective one of eight leads collectively designated 33''. The cable carrying all sixteen of these leads has been indicated at 33.

Each of the leads 33' carries a "direct" signal assumed to be a positive potential when the corresponding photocell is excited, otherwise a negative one. Conversely, each of the leads 33'' carries an "inverted" signal assumed to be a negative potential when its photocell is excited, otherwise a positive potential. The direct signals have been indicated by the letters $j$, $n$, $v$, $c$, $s$, $b$, $e$ and $d$ corresponding to the similarly designated code elements of Fig. 1; the inverted signals have been indicated by the letters $\bar{j}$ (pronounced "j bar"), $\bar{n}$, $\bar{v}$, $\bar{c}$, $\bar{s}$, $\bar{b}$, $\bar{e}$ and $\bar{d}$.

In practice, each of the leads 33 is suitably multiplied to make the corresponding signal $j$, $n$, $v$ etc. or $\bar{j}$, $\bar{n}$, $\bar{v}$ etc. available at a plurality of points as will subsequently appear. It will be understood that these multiple connections will be isolated from one another, e. g. by means of rectifiers (diodes) in the manner illustrated in Figs. 3 and 4 or with the aid of amplifier (e. g. cathode follower) stages.

Fig. 6 gives an overall schematic view of a translator designed to convert the information on a perforated tape (or equivalent recording medium) into a printed text. The principal elements of the translator shown in Fig. 6 are an entrance stage 35, a computer stage 36 and a utilization stage 37.

Two perforated tapes 1A and 1Z, each similar to tape 1 of the preceding figures, are fed into respective pick-up heads 21A, 21Z each of the type of head 21 shown in Fig. 5. Tape 1A represents the principal record produced by the recorder 5 (Fig. 2) upon the original typing of the text on sheet 8; tape 1Z represents the correction record produced upon the retyping of all error-containing lines of this text as previously described. Conductor 28 of Fig. 5, leading to the actuating winding 26 of stepping magnet 25, is duplicated in Fig. 6 at 28A and 28Z for each of the heads 21A and 21Z, respectively; conductor 29, leading to the blocking winding 27 of magnet 25, is similarly duplicated at 29A and 29Z. Stepping impulses are periodically applied to conductors 28A and 28Z, at intervals $\theta$ (cf. Fig. 1), by a timer 38. Each of conductors 29A and 29Z is multiplied to a lead 39 from timer 38 and to a respective lead 41 or 42 from a selector 40. The output multiples 33A and 33Z of pick-up heads 21A and 21Z, corresponding to multiple 33 of Fig. 5, are connected by way of respective gate circuits 45 and 46 to a junction circuit 47 whence they continue as a single cable 33 to output circuit 48. A branch 33A' and 33Z' of each of these multiples also extends to selector 40 from which two leads 43, 44 pass toward the gates 45 and 46, respectively. Output circuit 48 may contain one or more amplifier stages for the signals transmitted over multiple 33.

The signals from entrance stage 35 are delivered to the input circuit 49 of computer stage 36. Circuit 49 works into a first distributor 50, connected to a memory unit 51, and into a second distributor 52, connected to a computer 53. Data from computer 53 are stored in two additional memory units 54 and 55. An evaluator 56 is controlled from the three memory units 51, 54, 55 and, by way of a lead 57, from timer 38 which is also linked to computer 53 by two signal paths, one for each direction of traffic, schematically represented at 58, 59. Evaluator 56 works into an output circuit 60 which again may contain a number of amplifying stages as required. It will be understood that memories 51, 54, 55 need not be separate units but may form part of a single unit representing the general memory of a so-called universal computer.

The final or utilization stage 37 has its input circuit 61 connected to the output circuit 60 of stage 36. Signals from circuit 61 are applied to a converter 62 controlled from timer 38 over a lead 63. Converter 62, in turn, controls the printer 64 which produces a printed page 65 from the data supplied to it by the converter; the line-by-line advance of page 65 is controlled by a circuit 66 responsive to signals delivered via a lead 67 from timer 38.

In operation, as will be described in greater detail with reference to subsequent figures, the entrance stage 35 combines the entries on tapes 1A and 1Z so that the signals applied by output circuit 48 to input circuit 49 represent the text and service informations relating to the fully corrected message to be printed. These signals are temporarily stored in memory unit 51, distributor 50 serving to suppress the numerical codes N which have served their function in controlling the selector 40 of stage 35. At the same time, these signals are also applied by distributor 52 to computer 53 which determines the length (in units of space) of a series of entries delivered to stage 36, as well as the number of blanks in such series, and applies these data to memory units 54 and 55, respectively. Evaluator 56, on the basis of information supplied to it from memory units 51, 54 and 55, determines the length of a train of text elements (characters and spaces) to be printed in a single line appearing on page 65, this train of text elements together with the accompanying service informations being fed via circuits 60, 61 to converter 62 which translates them into conventional printing signals (e. g. Baudot-type code pulses) adapted to control the printer 64.

The function of selector 40 is to block alternately the pick-up heads 21A and 21Z so that only one of these devices will respond at any time to the stepping impulses applied to them simultaneously over leads 28A, 28Z. Gate 45 is unblocked by the selector, via lead 43, whenever pick-up head 21A is operative, except during the scanning of a line of original text which has been superseded by a corrective line on tape 1Z. Gate 46 is unblocked by the selector 40, via lead 44, whenever pick-up head 21Z is operative. Timer 38 is controlled from computer 53, over signal path 59, to apply blocking voltages to leads 29A and 29Z whenever a sufficiently long series of entries has been delivered to input circuit 49, whereby both pick-up heads are simultaneously inactivated until after the evaluator 56 has completed its work.

A suitable circuit for the selector 40 is shown in Fig. 7. The leads 33A' and 33Z' coming from pick-up heads 21A and 21Z (Fig. 6) extend to respective distributors 68A, 68Z controlling registers 69A and 69Z, respectively; these registers may be of the static or single-stage type. Distributors 68A and 68Z apply to the registers only the code combination identified by their flag portions (single perforation in row $n$, Fig. 1) as numerical codes N. A decoder 70A, controlled by register 69A, translates all the codes N appearing on tape 1A into potentials (e. g. of positive polarity) increasing progressively with the numerical values value of these codes; a decoder 70Z, controlled by register 69Z, similarly translates all the codes N appearing on tape 1Z into progressively increasing potentials of like polarity. The potentials produced by both decoders 70A, 70Z are applied to respective inputs of a comparator 71.

Comparator 71 is arranged to supply unblocking potentials (positive) or blocking potentials (negative) to the four output conductors 41, 42, 43, 44 of selector 40. The comparator is of a type delivering a relatively positive output voltage whenever the potentials applied to its inputs by circuits 70A and 70Z are different, regardless of their relative polarity; it delivers a relatively negative output voltage when the two potentials are alike. This output voltage is applied directly to conductor 41 and by way of an inverter 72 to conductors 42 and 44; the voltage on conductor 41 is communicated to conductor 43 via a junction circuit 73. The comparator 71 also applies its inverted output voltage, e. g. via conductor 42, to a gate circuit 74 which is traversed by the output of decoder 70A, this output passing through a condenser 76 on its way to one input of a second comparator 75. The same output is also applied to another input of comparator 75 across a condenser 77. Leakage resistors 78 and 79 connect the two inputs of comparator 75 to ground. Comparator 75, which may comprise for example, a bistable multivibrator, produces a relatively positive output potential only when a positive pulse is applied to it by way of condenser 76; it thereafter remains in this condition until a positive pulse is applied to it by way of condenser 77, its output potential thereupon again assuming a normal, relatively negative value. The output potential of comparator 75 controls a gate circuit 80 blocking or permitting the application of a highly negative voltage from a battery 81 to conductor 43 via junction 73; it will be noted that junction 73 includes a rectifier so poled as to prevent this negative voltage from reaching conductor 41. The combination of condenser 76 and resistor 78 is shunted by a rectifier 82.

For an understanding of the operation of selector 40 it should be remembered that the line numbers represented by code entries N on tape 1A run consecutively, e. g. from 0001 through 9999, whereas only some of these entries appear also on tape 1Z. On the assumption of a relatively low incidence of faulty lines in the original typewritten text, therefore, the numerical value of entries N on tape 1Z will usually increase by large steps, as by jumping from, say, 0004 (first faulty line) to 0005, 0011, 0027, 0053 and so on. Let us suppose, then, that the tapes 1A and 1Z have just been fed into their respective pick-up heads 21A and 21Z, that the photocells 30 (Fig. 5) of head 21A are scanning the first numerical code 0001 appearing on tape 1a and are causing this code to be stored on register 69A, and that head 21Z is simultaneously scanning the first numerical code 0004 appearing on tape 1Z and is causing its storage on register 69Z. Decoder 70A, therefore, applies to comparator 71 a positive potential which is lower than that applied to the comparator at the same time by decoder 70Z.

The comparator 71, responding to the inequality of its input potentials, applies positive voltage to conductor 41 and negative voltage to conductors 42 and 44 as well as to gate 74, thus blocking the latter. Comparator 75 has been preset, e. g. by a manual control device not shown, to its normal condition in which its output is negative and blocks gate 80. Thus, the positive voltage on conductor 41 also finds its way to conductor 43 across junction 73. Pick-up device 21A and gate 45 are, therefore, operative to establish a channel for the transmittal of the contents of tape 1A to output circuit 48, pick-up device 21B and gate 46 being blocked.

The stepping magnet 25 of head 21A, responding to impulses transmitted over lead 28A, advances the tape 1A until the next line numeral, 0002, is read. At this point the potential in the output of decoder 70A is increased by one step but still falls short of the potential in the output of decoder 70Z, hence the condition of comparator 71 remains unchanged. At the same time the change in the output of decoder 70A ineffectually applies a positive pulse to comparator 75 across condenser 77. The same situation exists when head 21A subsequently reaches the numerical code N corresponding to line 0003 of the original text.

When, however, numerical code 0004 is read by device 21A, the potentials of the two inputs of comparator 71 become equal and the voltages on all four output conductors 41, 42, 43, 44 are reversed. Thus, the stepping magnet of head 21A is arrested, gate 45 is blocked, head 21Z is stepped and gate 46 becomes conductive, thereby establishing a channel for the transmittal of the contents of tape 1Z to output circuit 48. At the same time, gate 74 becomes conductive and applies the potential of decoder 70A to comparator 75, in the form of a brief positive pulse, by way of condenser 76; comparator 75 is thus tipped into its alternative condition of conductivity, applying a positive voltage to gate 80 and effectively connecting battery 81 to conductor 43, thereby driving the potential thereon still more negative.

After the corrected line on tape 1Z has been read and communicated to computer stage 36, a new numerical code is scanned by head 21Z, assumed to identify the next line 0005. Since now the potentials controlling comparator 71 are again unequal, the comparator again reverses its condition to activate channel 33A while blocking channel 33Z. Owing to the provision of rectifier shunt 82, condenser 76 does not transmit a negative pulse to the lower input of bistable comparator 75, hence the latter's condition remains unchanged and the negative terminal voltage of battery 81 overrides the positive voltage applied to conductor 43 from conductor 41. Gate 45 remains, therefore, blocked during the reading of line 0004 on tape 1A which line, it will be remembered, had been replaced by the correspondingly numbered line on correction tape 1Z.

After the pick-up head 21A has progressed to the next line number 0005 on tape 1A, the output voltage of decoder 70A is again increased and a positive pulse is transmitted to the upper input of comparator 75; since now, however, the line numbers stored on registers 69A and 69Z are once more alike, equal voltages are applied to comparator 71 and the latter unblocks the gate 74 so that a positive pulse is simultaneously also transmitted through condenser 76, leaving unchanged the condition of comparator 75. Comparator 71 now causes tape 1Z to advance to the point where the next numerical code N, assumed to have the value of 0011, appears on register 69Z.

Now again, as after the reading of line 0004 on tape 1Z, the condition of comparator 71 is reversed and tape 1A is advanced past pick-up head 21A, gate 45 remaining blocked as before to prevent the feeding of superseded original text line 0005 into junction 47. When the next line code is reached, the increase in the output voltage of decoder 70A applies a positive pulse to comparator 75 across condenser 77 and, by causing the latter to block gate 80, lifts the negative potential from conductor 43. Comparator 71 remains normal and code elements from tape 1A are transmitted to computer stage 36 until a code matching the one stored on register 69Z, assumedly of numerical value 0011, is received by register 69A.

In the preceding description it has been assumed that each numerical value of code N produces a different potential in the output of decoder 70A (or 70Z). It will be readily understood that, in practice, the number of different potentials required may be considerably reduced by substituting potential combinations for single potentials, e. g. by using a combination of four potentials each capable of assuming ten distinct magnitudes to express 10,000 numerical values.

Figure 8:
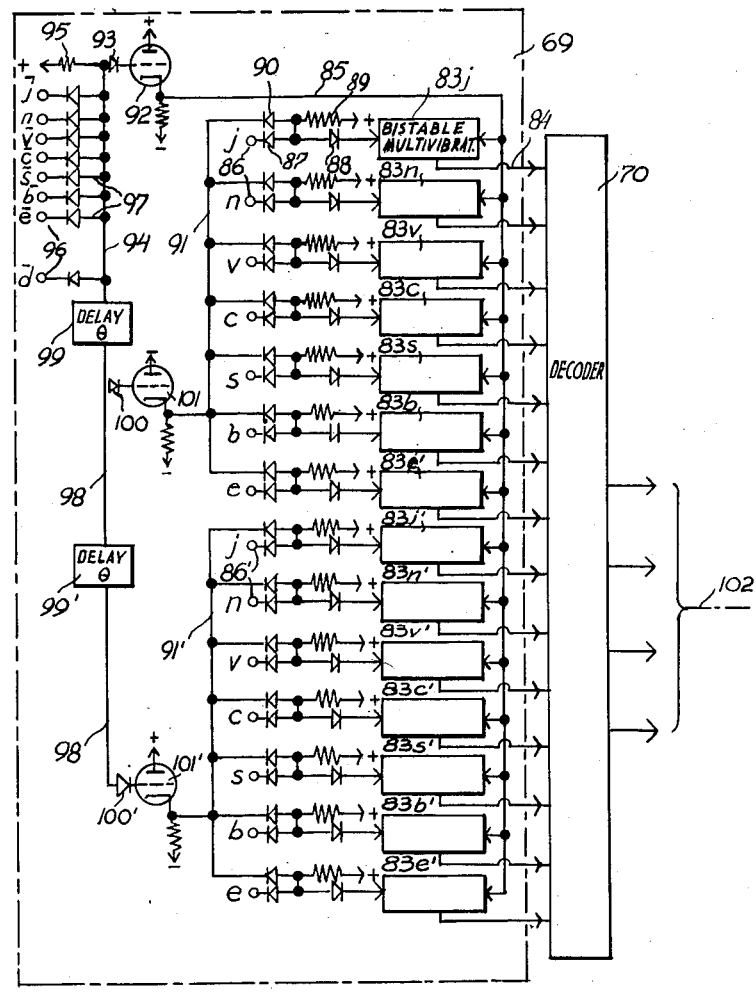
Fig. 8 is a detailed circuit diagram of a single-stage register included in the diagram of Fig. 7.

In Fig. 8 we have shown in detail a register 69 representative of either of registers 69A, 69Z of Fig. 8. This register comprises fourteen flip-flop circuits designated 83j, 83n, 83v, 83c, 83s, 83b, 83e and 83j', 83n', 83v', 83c', 83s', 83b', 83e', each of these circuits being preferably constituted by a bistable multivibrator as indicated. Each multivibrator has an output lead 84 extending toward decoder 70 and arranged to carry either a relatively positive or a relatively negative voltage, dependent upon the condition of the respective multivibrator whose normal or zero condition may be assumed to give rise to a negative output. A zeroizing lead 85 is multipled to the right-hand inputs of all the multivibrators and serves for their simultaneous resetting to normal by applying a positive impulse to these inputs. The other, left-hand input of each multivibrator is connected to a respective one of fourteen terminals 86 (first seven multivibrators 83j through 83e) or 86' (last seven multivibrators 83j' through 83e') by way of a pair of rectifiers 87, 88 connected in series back-to-back. The junction of these rectifiers is connected through a resistor 89 to positive potential and through a further rectifier 90 to a bus bar 91 (multivibrators 83j through 83e) or 91' (multivibrators 83j' through 83e').

Lead 85 is connected to the cathode of a cathode follower tube 92 having its grid connected, via a rectifier 93, to a conductor 94 connected in turn, through a resistor 95, to positive potential. A group of eight terminals 96 are connected to conductor 94 through respective rectifiers 97; these terminals are joined to certain leads of multiple 33A' (Fig. 7) so as to have the respective signals $\bar{j}, \bar{n}, \bar{v}, \bar{c}, \bar{s}, \bar{b}, \bar{e}$ and $\bar{d}$ applied to them as indicated. In similar manner, each of the seven terminals 86 as well as each of the seven terminals 86' has a respective signal j, n, v, c, s, b and e applied to it.

Conductor 94 is further connected to a conductor 98 by way of a delay network 99 introducing a time delay θ; conductor 98, in turn, is connected via a similar delay network 99' to a conductor 98'. Conductor 98 is connected through a rectifier 100 to the grid of a cathode follower tube 101 whose cathode is tied to bus bar 91; in analogous manner the conductor 98' is connected through a rectifier 100' to the grid of a cathode follower tube 101' having its cathode tied to bus bar 91'.

The selection of signals applied to terminals 96 insures that the register 69 is responsive only to the numerical codes N, i. e. to codes whose flag portions consist of a single perforation in position n so as to result in the simultaneous application of positive potentials to all eight of these terminals. It will be understood that any other combination (including a no-signal condition in the absence of any perforations on tape 1) will result in the presence of negative potential on at least one of terminals 96, thereby causing a current to flow through resistor 95 which maintains the potential of the grid of tube 92 and, thereby, of conductor 85 at a relatively negative value. When the special signal combination corresponding to the flag portion of code N occurs, the cathode of tube 92 is driven positive and a zeroizing impulse is applied to all multivibrators 83j through 83e'. A positive enabling impulse is simultaneously transmitted through delay networks 99 and 99', reaching the grid of tube 101 after a time interval θ and the grid of tube 101' after a time interval 2θ.

When the multivibrators are in their normal or zero condition, they remain unaffected by positive impulses applied to any terminal 86 or 86' as long as the associated cathode follower tube 101 or 101' is non-conductive or in a relatively low state of conductivity, as will be the case in the absence of the enabling impulse mentioned above. When, however, such an impulse is applied to tube 101, the signal voltages present at that time on terminals 86 as a result of the scanning of the combination of perforations in the first file of the signal portion of code N result in the reversal of certain of the first group of multivibrators 83j—83e; similarly, when the enabling impulse subsequently reaches tube 101', the signal voltages present on terminals 86' will be due to the scanning of the second file of the signal portion of that code and will reverse certain of the second group of multivibrators 83j'—83e'. Thus, after the perforations constituting the three files of a numerical code N have moved past the photocells 30 of pick-up head 21, the fourteen multivibrators of the associated register 69 apply a combination of potentials to decoder 70 which latter, in a manner known per se (e. g. by means of conventional diode of resistance matrices), derives from these potentials a characteristic output voltage or, preferably, a combination of such output voltages appearing on a suitable number of output leads, e. g. the four leads shown at 102 in Fig. 8.

It will be understood that the register 69 of Fig. 8 may be readily modified for the selective storage of any other of the codes discussed in connection with Fig. 1. Thus, the code J will be registrable if terminals 96 are connected to conductors carrying the signal combination $\bar{j}$—$\bar{n}$—$\bar{v}$—$\bar{c}$—$\bar{s}$—$\bar{b}$—$\bar{e}$—$d$, it being necessary, however, to provide one more multivibrator in each of the groups associated with bus bars 91 and 91' for the purpose of registering the code elements appearing in row d (which is unperforated in the code N). For a code such as V, on the other hand, only eight multivibrators will be required and the circuit 91', 98', 99', 100', 101' may be omitted.

In Fig. 9 there has been illustrated a multi-stage register 103 generally similar to the one shown in Fig. 8 but adapted for the storage of a plurality of successive code combinations in its several stages. Register 103 comprises a first stage of eight multivibrators 104j, 104n, 104v, 104c, 104s, 104b, 104e, 104d, a second stage of eight multivibrators 104j', 104n', 104v', 104c', 104s', 104b', 104e', 104d', and any number of additional such stages not shown. Input terminals 105 are arranged to receive "direct" signals j, n, v, c, s, b, e and d, respectively. Each of these terminals is connected to the left-hand input of a respective multivibrator of the first stage via a delay coil 106 and a condenser 107; each terminal 105 is further connected over a resistor 108 to negative potential and over an individual rectifier 109 to bus bar 110 which latter, in turn, is connected to negative potential by way of a resistor 111. Bus bar 110 extends to a grid of a cathode follower tube 112, another grid of this tube being connected to a terminal 113. The cathode of tube 112 is connected to a zeroizing conductor 114, multipled to the right-hand inputs of multivibrators 104j through 104d, to a similar conductor 114', multipled to the right-hand inputs of multivibrators 104j' through 104d', and to like conductors of subsequent stages (not shown). Each of the multivibrators of the first stage has an output lead connected via a delay coil 106' and a condenser 107' to the left-hand input of a corresponding multivibrator of the second stage; in analogous manner, each multivibrator of the latter stage has an output lead connected via a delay coil 106″ and a condenser 107″ to an output of a respective multivibrator of the next following stage (not shown).

When a positive potential is impressed upon one or more of terminals 105, the upper grid of tube 112 is driven positive and causes a resetting impulse of positive polarity to be applied to all the multivibrators of the register. If any multivibrator of the first stage, e. g. device 104j, was previously off-normal, its resetting causes a positive impulse to pass through delay coil 106′ and condenser 107′ toward the corresponding multivibrator, i. e. device 104j′, of the second stage which is thus driven off-normal an instant after the resetting step. In similar manner an activating impulse is transmitted from any previously off-normal multivibrator of the second stage to a corresponding multivibrator of the next stage, and so on. At the same time the original positive signal applied to any of the terminals 105 passes in the form of a slightly delayed activating impulse through coil 106 and condenser 107, whereby one or more of the multivibrators of the first stage are driven off-normal in accordance witth the signal combination appearing at the input of the register. It will thus be seen that each code combination fed into register 103 successively traverses its several stages, a number of such combinations equal to the number of stages being thus simultaneously storable in the register.

Terminal 113 serves for the progressive emptying of the register 103 by the application of a succession of positive stepping impulses to this terminal. With no signal voltages present on terminals 105, i. e. with all of these terminals held at a relatively negative potential, the application of the first stepping pulse to terminal 113 produces a zeroizing impulse on conductors 114 and 114′, thereby resetting all multivibrators and causing any multivibrator of a succeeding stage to assume the erstwhile condition of its counterpart in the stage immediately preceding, in the manner previously described. Owing to the absence of an input signal combination, however, all the multivibrators of the first stage will now remain normal. The next stepping impulse similarly normalizes the second stage of the register, transferring the code combination thereof to the next stage (or to a utilization circuit outside of the register, such as the decoder 70 of Fig. 8, if there are only two stages), and in this manner each code combination stored in the register is repeated from one stage to the next and is finally discharged from the register. The circuit of Fig. 9 is representative of various elements of the computer stage 36 to be described in greater detail hereinafter.

Before considering the structural arrangement of this computer stage, it will be well to analyze the nature of the task of justification which this stage is called upon to perform. Fundamentally, justification requires the assembly of a series or train of text elements (characters and spaces) whose cumulative length L, expressed as an integral number of unit lengths, is equal to or less than the predetermined length J of a printed line as selected by the compositor and recorded in the form of the similarly designated justification code (Fig. 1). If the length L is less than the length J, which in practice will usually be the case, the difference $J-L$ must be distributed over the available word spaces whose number will be designated by the letter W. Each word space, therefore, will have to be increased by the quotient of the division $(J-L)/W$, this being not exactly possible where such quotient is of the form $Q+R/W$ (R being a remainder). Since, however, $R(Q+1)$ $(W-R)Q=QW+R$, the right hand member of this equation being by definition equal to $J-L$, it will be seen that the desired justification may be attained by increasing each of the first R spaces by a length equal to $Q+1$ and increasing the remaining $W-R$ spaces by a length equal to Q. The computer about to be described with reference to Figs. 10a–10d is adapted to carry out this operation.

The foregoing analysis is strictly correct only if there are no restrictions to be observed in the termination of a printed line. The rules of grammar, however, impose limitations upon the manner in which a line may be broken off and, in particular, prevent the separtion of certain text elements. A partial list for the English language of elements which ought not to be separated, limited to four-element groups, is given in the following table; it should be borne in mind, however, that usage imposes additional prohibitions which cannot be generalized in this form and which an automatic system of the character herein disclosed could recognize as such only with the aid of a special (no-division) code combination embodied in the text, along with the other service informations, by the compositor.

In the table given below:

\* symbolizes any text element (character or space)
Y symbolizes any character (letter, numeral or punctuation mark)
X symbolizes any consonant
T symbolizes any consonant other than l, m, n, r, s
U symbolizes any vowel
O symbolizes a space
5 symbolizes any numeral
; symbolizes any punctuation mark
Small letters represent themselves.

A slant/indicates the prohibited division:

| | | |
|---|---|---|
| \*5/5\* | Xw/Y\* | \*s/s\* |
| O;/Y\* | \*c/Y\* | lr/Y\* |
| \*Y/;O | \*j/Y\* | nb/Y\* |
| OY/Y\* | \*q/Y\* | nf/Y\* |
| \*Y/YO | \*v/Y\* | nl/Y\* |
| \*U/U\* | \*X/h\* | nm/Y\* |
| \*Y/XX | \*Y/x\* | nn/Y\* |
| TX/Y\* | \*e/r\* | nr/Y\* |
| \*Y/UU | mm/Y\* | \*Y/OY |

The last prohibition in the above list results from the desirability of suppressing a space at the beginning of a new line; it will not be necessary where such initial space is automatically eliminated by the apparatus. The list is, of course, only illustrative and may be supplemented or modified, e. g. so as allow the splitting of words only in a small number of well-defined instances or not at all. Since the apparatus cannot distinguish between four-element combinations (e. g. r-e-a-d) where division is improper (as between the vowels e-a in "reading") and where it is permissible (as between the same vowels in "readjust"), it is preferable to err on the conservative side, e. g. by completely barring the splitting of vowels and of such combinations as e-r (usually inseparable in American usage, except in a few words such as "material"). It will be appreciated, of course, that greater flexibility is obtainable by increasing the number of discriminating stages of the system (described in connection with Figs. 10a–10d) to enable it to take more than four text elements into consideration.

Returning now to the mode of justification described above, it will be necessary for the apparatus not only to measure a sequence of characters and spaces having a length L equal to or just short of the justification value J but also to determine whether or not a break is permissible at the end of this sequence. If such break is prohibited, the sequence must be progressively shortened until a divisible character combination is reached. The length thus obtained, representing a train of text elements terminating in an element whose separation from the next character is allowable (e. g. a space, a vowel other than e followed by any consonant, or any vowel followed by a consant other than r), shall be designated Lt. The determination of the quotient $Q+R/W$ will then be carried out by substituting Lt for L in the mathematical operation previously described, i. e. by carrying out the division $(J-L_t)/W$.

A further modification of this operation will be necessary at the end and at the beginning of each paragraph. When the "end of paragraph" code E appears on the record tape, the sequence $L_e$ of assembled characters and spaces, whose numerical weight is determined by the selected variety of type faces (code V), is supplemented by a number of spaces to make the total length equal to the value L previously defined; thus $L_e+S_e=L$, $S_e$ being the cumulative length of the justifying end-of-paragraph spaces added. These justifying spaces may each have a fixed value independent of the font selected; if this value is equal to one unit length, it will evidently be possible always to add just enough spaces to make the value of $L=L_e+S_e$ exactly equal to J, hence no further justifying operation will be required. In a more general manner, however, a justifying space may be given an arbitrary value of any integral number of unit lengths, in which case the length L will again be selected as the value nearest to but not exceeding J, the aforedescribed mathematical operation being then carried out as before by dividing the number of spaces W (considering only the weighted sequence $L_e$) into the difference $J-(L_e+S_e)$. Clearly no determination of line terminability is required in either case.

At the beginning of a paragraph, indicated by the appearance of a code B, a fixed number of spaces of cumulative length $S_b$ are arranged to precede the sequence of text elements whose length $L_b$ must be selected so that $S_b+L_b=L_t$ as previously defined, the exact value of $L_t$ being again determined by the choice of a proper breakup point as in the case of any line other than the last line of a paragraph. Hence, justification again requires the number W of weighted spaces in sequence $L_b$ to be divided into the difference $J-(L_b+S_b)$, resulting in an integral quotient Q and a remainder R serving to lengthen the weighted spaces in the manner outlined above.

A convenient way of determining the length $L_t$ of a terminable sequence of text elements consists in placing the last K characters and blanks (K being an integral number) of an established sequence of length $L(L \leq J)$ in a reserve so as to leave only a foreshortened sequence of length $L-L_k$ to be tested for terminability. If a break is found to be prohibited, the elements of the reserve are progressively added to the main sequence until a divisible character combination is found, at which time the length of the reserve will have been reduced to $k$; thus, $L_t=L-L_k$. The values of Q and R are determined from the previously established relationship $$QW+R=J-L_t=J-L+L_k=D$$

Since the difference D must be spread over the available spaces in the sequence retained, it will be necessary to enlarge each of these spaces to an extent proportional to D and inversely proportional to the number W of such spaces. If the number of spaces is small, their length may have to be objectionably increased if D is large. To obviate this drawback it is required that D be at all times not more than equal to a value $M=\Sigma m$ where $m$ is the maximum length allowed to be added to any space. Thus, by weighting each space in the sequence so as to increase its length by $m$, the computer first determines M W$m$ and then compares it with D by carrying out the subtraction $M-D=M-(J-L+L_k)$. If the difference $M-D$ is negative, the value of D must be decreased by reducing $L_k$ through the transfer of additional text elements from the reserve to the main sequence until a new permissible breakup point is reached. If the elements transferred include one or more spaces, this operation will incidentally increase the value of W and, hence, of M so that the desired limitation of space length will be more rapidly achieved.

Reference is now made to Figs. 10a–10d for a detailed description of the computer stage 35 of Fig. 6. The input circuit 140, Fig. 10a, comprises sixteen terminals 115 upon which the previously defined signals $d, \bar{d}, e, \bar{e}, b, \bar{b}, s, \bar{s}, c, \bar{c}, v, \bar{v}, n, \bar{n}, j, \bar{j}$ are impressed as indicated. A set of conductors 116 extend from terminals 115 toward distributor 150 which introduces a delay equal to one unit interval $\theta$ and incorporates a plurality of circuits, each of the character shown in Fig. 8, adapted to discriminate between the various code combinations. The distributor 150 has six outgoing channels designated 117J, 117V, 117C, 117S, 117B, 117E leading to respective registers 118J, 118V, 118C, 118S, 118B, 118E. Multiples 117C and 117S, carrying code signals representing characters and spaces which together constitute the text elements as distinct from service informations, also extend to a junction circuit 119; channel 117J further extends to a subtractor 120 which also receives over a channel 121 the code previously stored in register 118J. It will thus be understood that the latter register may comprise a circuit similar to that of the first stage of register 103 (Fig. 9) but with enough multivibrators to accommodate the sixteen elements of the signal portion of code J. The subtractor 120, as well as other arithmetical computing devices shown in Figs. 10a–10d, are all of a construction well known per se; reference may be made, for example, to Figs. 13-21 and 13-24 of the book "High-Speed Computing Devices," by Tompkins, Wakelin and Stiffler, Jr., Engineering Research Associates, Inc., published 1950 by McGraw-Hill Books, New York.

The numerical value stored in register 118V controls two weighting circuits 122 and 123 which receive the output of registers 118C and 118S, respectively. Circuit 122 translates the character code combinations of register 118C into potentials representing different numerical values of predetermined relative magnitudes; the absolute magnitudes of these potentials, hence of the values indicated thereby, are co-determined by the output of register 118V representing the selected variety of type faces. Circuit 123 similarly weights the space code combinations of register 118S and applies them to an outgoing lead 124 extending to a junction circuit 125; it additionally weights the same space code combinations by adding aforementioned maximum increment $m$ to the basic value transmitted over lead 124 and applying the so augmented value to a lead 126. Junction circuit 125 also receives the output of circuit 122 over a lead 127.

It will be understood that channels 117J, 117V and 117C each represent a seven-wire multiple, since the files of the signal portions of the corresponding codes J, V and C may contain up to seven distinctive code elements (perforations) translated into a like number of characteristic (assumedly positive) potentials. Channels 117S, 117B and 117E, on the other hand, are single conductors since only a single potential, corresponding to the perforation on row $d$, need be transmitted. Channel 121, similarly, represents a fourteen-wire multiple whose several conductors extend from the sixteen storage devices (e. g. multivibrators) of the register 118J which may be substantially of the form illustrated in Fig. 9; thus, the two eight-element code combinations successively received by the register upon each transmittal of a justification code J cause the code previously stored therein to be discharged over multiple 121 into subtractor 120. It should be noted, however, that register 118J lacks the zeroizing input 113 of Fig. 9; this is also true of register 118V which otherwise may be considered identical with the first stage of register 103. Both of these registers, therefore, retain their contents until a new code of the appropriate kind is received by distributor 150. Register 118C, while being otherwise similar to register 118V, is provided with a zeroizing terminal T1 controlled from the timer 38 of Fig. 6; registers 118S, 118B and 118E, each of which may consist of a single multivibrator, also have respective zeroizing terminals T2, T3 and T4. The resetting and other control pulses applied by the timer to various terminals T—, or vice versa, have been illustrated in Fig. 11; for the sake of clarity, all of these terminals have been left unconnected in Figs. 10a–10d.

A branch of conductor 124 bypasses junction circuit 125 and terminates at a register 128 (Fig. 10b) adapted to count the number of space codes C passing through distributor 150. This register, accordingly, increases its stored value by unity whenever a positive pulse, of any amplitude, is transmitted by weighting circuit 123 over lead 124. Register 128, therefore, determines and stores the value W previously identified. The potential (or combination of potentials) so stored is also communicated to a reader 129 which is simply a normally blocked gate adapted to be unblocked by a control pulse applied to its terminal T5; at that time the value registered in circuilt 128 is transmitted over a single or multiple lead 130 the negative input of a totalizer 131 (Fig. 10d).

Register 118J is also associated with a reader 132 whose control terminal is shown at T6. The output of this reader is applied, via a lead 133, to one input of an indicator 134 feeding the negative input terminal of a totalizer 135. The positive input terminal of this totalizer is connected to the output of an adder 136 whose two inputs are respectively connected to weighting circuit 123 via lead and to the output of register 187 via a lead 137.

Certain of the input terminals 115, carrying the signals $\bar{d}$, $\bar{e}$, $\bar{b}$, $\bar{s}$, $\bar{c}$, $\bar{v}$, $\bar{n}$ and $\bar{j}$, are also connected by way of conductors 138 to a delay network 139 introducing a delay equal to a unit interval $\theta$, thence to a gate circuit 141 and finally to a memory unit 142, the latter being a multi-stage, eight-element register as illustrated in Fig. 9 but with enough stages to accommodate the maximum number of spaces and characters to be contained in any single printed line. A second, smaller memory unit 143, preceded by a distributor 144, serves to store the justification code J. It will be understood that units 143 and 144, together, represent a network similar to device 69 (Fig. 8) except that the input terminals 145 of distributor 144 (corresponding to terminals 96 of device 69) have the signal combination $\bar{j}$—$\bar{n}$—$\bar{v}$—$\bar{c}$—$\bar{s}$—$\bar{b}$—$\bar{e}$—$\bar{d}$ applied to them, instead of the combination $$j-n-v-c-s-b-e-d$$

as in Fig. 8. Unit 142 has an additional input, corresponding to stepping terminal 113 of Fig. 9, connected to a terminal T7. It is also associated with a reader 146, connected in turn to an impulse counter 147; unit 146 also has an input connected to terminal T7. A zero indicator 148, controlled by counter 147, has an output terminal T8.

Distributor 144 is shown to include three vacuum tubes which correspond to tubes 92, 101, 101' of Fig. 8 and whose plates are connected, via respective condensers, to a lead 151 extending to the suppressor grids of three pentodes 152, 153, 154. Lead 151, accordingly, carries a negative voltage pulse whenever one of the three tubes of distributor 144 is energized, thus at three successive instances separated by intervals $\theta$ each time a new code J is registered in memory 143. A delay network 155, shown inserted in lead 151, introduces a time lag $\theta$ matching the delay provided by network 139, whereby the three negative pulses from distributor 144 will reach the control tubes 152, 153, 154 exactly when the three portions of any code J are transmitted over conductors 138 to gate 141. This gate is normally blocked and adapted to be unblocked by a positive pulse from the cathode of any one of pentodes 152, 153, 154. Pentode 152, normally cut off, produces such positive pulse (in the absence of a blocking voltage from distributor 144) whenever positive voltage appears simultaneously on two conductors 156, 157 connected to its two remaining grids; pentode 153 responds in like manner to positive voltages on conductors 157, 158, and pentode 154 is similarly controlled by conductors 158, 159.

As will be seen from Fig. 10a, conductor 156 is connected directly to the terminal 115 marked $\bar{d}$; conductor 157 is connected via delay network 139 to the terminal 115 marked $d$; conductor 158 is connected directly to the terminal marked $d$; and conductor 159 is connected via network 139 to the terminal marked $\bar{d}$. Thus, conductor 156 applies to tube 152 the inverted signal $\bar{d}$; conductor 157 applies to tubes 152 and 153 a delayed but direct signal designated $d_\theta$; conductor 158 applies to tubes 153 and 154 the direct signal $d$; and conductor 159 applies to tube 154 a delayed and inverted signal designated $\bar{d}_\theta$.

It will thus be understood that an unblocking pulse is transmitted to gate 141 whenever one of the combinations $(\bar{d}d_\theta)$, $(dd_\theta)$ or $(d\bar{d}_\theta)$ is positive, i. e. when neither of the two components of one such combination is zero. If it is remembered that a positive value of $d$ occurs whenever the bottom row of tape 1 contains a perforation and that in the absence of such perforation there will occur a positive signal $\bar{d}$, then it will be apparent from Fig. 1 that one of the three aforesaid combinations will exist every time except upon the occurrence of a code N, i. e. except when there are no holes on two consecutive files of the tape. Considering further that the code combinations appearing at the gate 141 are delayed by an interval $\theta$, one sees that tubes 152, 153 and 154 remain inoperative throughout the transmission of both the flag portion and the two parts of the signal portion of any code N. Since code J is suppressed by the blocking potential applied over lead 151, only the codes V, C, S, B and E can pass through gate 141. Furthermore, the tubes 152, 153, 154 additionally discriminate between the flag portion of any of these codes, which actuates only tube 154, and the signal portions thereof which operate either tube 153 (one isolated perforation on row $d$) or tube 152 (two or more such perforations in succession). The positive pulses from the cathodes of these pentodes, besides unblocking gate 141, also serve as counting impulses which in the case of tube 154 are applied directly to counter 147 and in the case of the other two tubes are fed to an electronic switch 160. This switch, which is traversed only by impulses counting the signal portions of the codes, is controlled by a switch-over circuit 161 which is similar to distributor 144 but responds to the combination $\bar{j}$—$\bar{n}$—$\bar{v}$—$\bar{c}$—$\bar{s}$—$\bar{b}$—$\bar{e}$—$\bar{d}$ by having its input connected to corresponding conductors 116. Switch 160, normally routes the impulses from tubes 152 and 153 to a reserve counter 162, of K stages, whose overflow finally reaches the principal counter 147 via a lead 163; when, however, an impulse corresponding to the signal portion of a variety code V is received, circuit 161 responds to the flag portion of such code and, after the necessary delay $\theta$, shunts this impulse directly onto lead 163. Counter 162, accordingly, receives only the impulses representing text elements C and S, if we disregard the indentation codes B and E which are substantially without effect upon the operation of this counter as will subsequently appear.

From subtractor 120 a pair of leads 164, 165 extend to the positive and the negative input of a totalizer 166 which thus receives the numerical value of the justification code J from distributor 150. The result of the storage of this code on register 118J is that the output of subtractor 120 will remain zero as long as the value of a code J arriving over lead 117J is identical with the one previously registered for such code, so that leads 164, 165 will actuate the totalizer 166 only when a new justification value is introduced. Totalizer 166 is provided with a sign indicator 167 adapted to transmit a signal to the timer, by way of terminal T9, whenever the output of the totalizer passes from positive polarity to zero or negative; this has been indicated by the polarity of a rectifier 168 conducting only positive voltages to terminal T9.

Similar sign indicators are associated with other units of the computer. Thus, totalizer 131 is provided with a detecting device of this nature designated 169, this device rendering conductive a gate 170 when the totalizer output is positive, as has been symbolized by a rectifier 171, and a gate 172 when the totalizer output is negative, as has been indicated by the polarity of a rectifier 173. The cessation of positive potential applied to rectifier 171, occurring when the totalizer output goes from positive to zero or negative, produces a control signal on a terminal T10.

There is also provided a sign detector 174 connected to the output of totalizer 135. Detector 174 applies an unblocking pulse to a gate 175 across a rectifier 176, the gate being thus blocked when the totalizer output is either positive or zero. A comparator 177 (Fig. 10b) likewise works into a sign-detecting circuit 178 which transmits a negative output to a conductor 183 by way of a rectifier 179 and a positive output to a terminal T11 through a rectifier 180. This comparator has a pair of inputs connected, respectively, to a register 181 and to a memory unit 182; as in the case comparator 71 (Fig. 7), it has been assumed that the output of circuit 177 is positive in the case of unequal inputs and negative in the case of input equality.

While the inclusion of rectifiers in the circuits of sign detectors 167, 169, 174 and 178 is useful for an understanding of their mode of operation, it may be mentioned that in practice each of these detectors may comprise a flip-flop circuit (such as a multivibrator) arranged to send out a signal, of any convenient polarity, whenever the condition of the associated calculator changes in the sense indicated.

A conductor 184, connected via gate 175 to a terminal T12, merges with conductor 183 at a junction circuit 185 from which a lead 186 extends to a control electrode of reserve counter 162; branches 186', 186" of this lead are connected to similar control electrodes of register 187 and of register 188, respectively Circuit 188, which is a stepping register of K-2 stages, delivers its overflow to register 181 which is a similar unit of only four stages. Register 188 receives its charge from junction 119 over a lead 198.

Registers 181 and 188, which together have two more stages than register 187 or reserve counter 162 (K stages each), may actually be a single unit but have been illustrated as separate circuits in order to facilitate the understanding of the function of comparator 177 to be described hereinafter. Stepping or control terminals for counter 162 and registers 181, 187, 188 have been shown at T13, T14, T15 and T16. Register 187, whose input is derived from junction 125 via a conductor 189, also contols a summing register 190 having an input connected to lead 137m in parallel with the left-hand input of adder 136. Register 190, a control input of which is shown at T17, has an output conductor 191 which leads to one input of an adder 192 having its output applied through a gate 193 to the positive input of totalizer 166; the control terminal of gate 193 is shown at T18.

The second input of adder 192 and the second output of substractor 134 are both energized by the output of a reader 194 associated with a register 195 which is controlled from a memory unit 196 via a lead 199; this lead also extends to a junction circuit 197 where it merges with lead 189 from junction 125, the output of circuit 197 being applied to the negative input of totalizer 166 by way of conductor 165. Control terminals of units 194, 195 and 196 are shown at T19, T20 and T21.

The output of subtractor 134, besides being fed to the negative input of totalizer 135, is applied to a lead 200 which traverses a gate 201 and reaches one of the inputs of a subtractor 202 (Fig. 10d), another input of this substractor being energized from a reader 203 associated with summing register 190. The output of the subtractor 202 is impressed upon the positive input of totalizer 131 whose reader 204 is connected, via gate 172, to a memory unit 205. Two similar memory units 206, 207 are controlled from a terminal T22 by way of gate 170. The inputs of units 205, 206, 207 are connected in parallel to a space code detector 208 operating upon a signal channel 209 which extends from the output of reader 146. Output signals from memories 206 and 207 are applied to two inputs of a junction circuit 210 by way of gates 211 and 212, respectively. A zero indicator 213, controlled from memory 205 and assumed to have an output which is positive when the value stored in this memory is finite and negative when it is zero, applies an unblocking potential to gate 211 in the first-mentioned condition and, via an inverter 214, to gate 212 in the last mentioned condition of memory 205.

Junction 210 has an output channel 220 extending toward an output multiple 211. Another junction circuit 215 is supplied from reader 146, via channel 209, and in addition receives the output of a reader 216, associated with memory unit 143, by way of a gate 217. The latter gate is arranged to be unblocked by an output signal from a subtractor 218 which receives the ouput of reader 216 directly and also by way of a register 219, this arrangement being similar to the combination of register 118J and register 120. It will be understood that subtractor 218 will unblock gate 217 only when a code signal applied to the subtractor directly by reader 216 differs from a code signal previously stored in register 219, hence only when the value of justification code J is changed. Junction 215 has an output lead included in multiple 221.

Various additional control terminals are provided at T23 (register 129), T24 (totalizer 131), T25 (reader 203), T26 (reader 204), T27 (memory 205), T28 memory 206), T29 (memory 207), T30 (reader 216), T31 (register 118B), T32 (register 118E), T33 (comparator 177), T34 (gate 201), T35 (totalizer 135), T36 (lead 199).

Figure 10B:
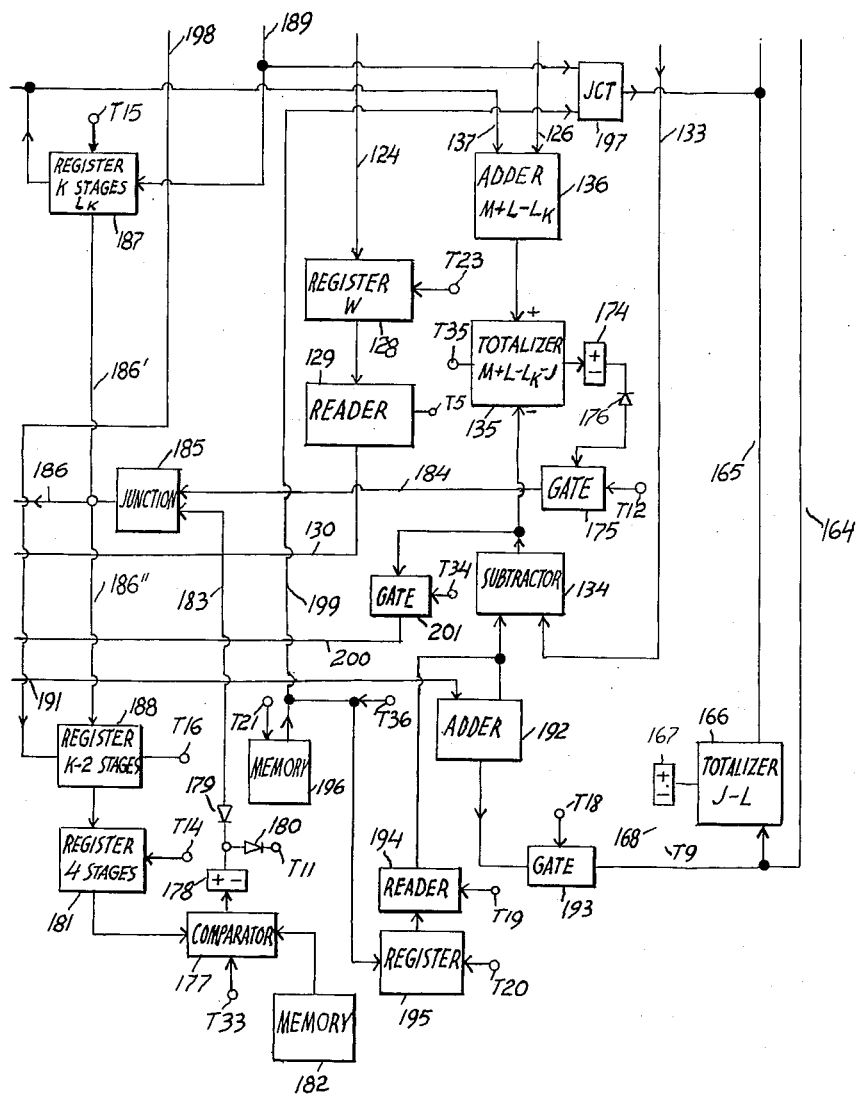
Figure 10C:
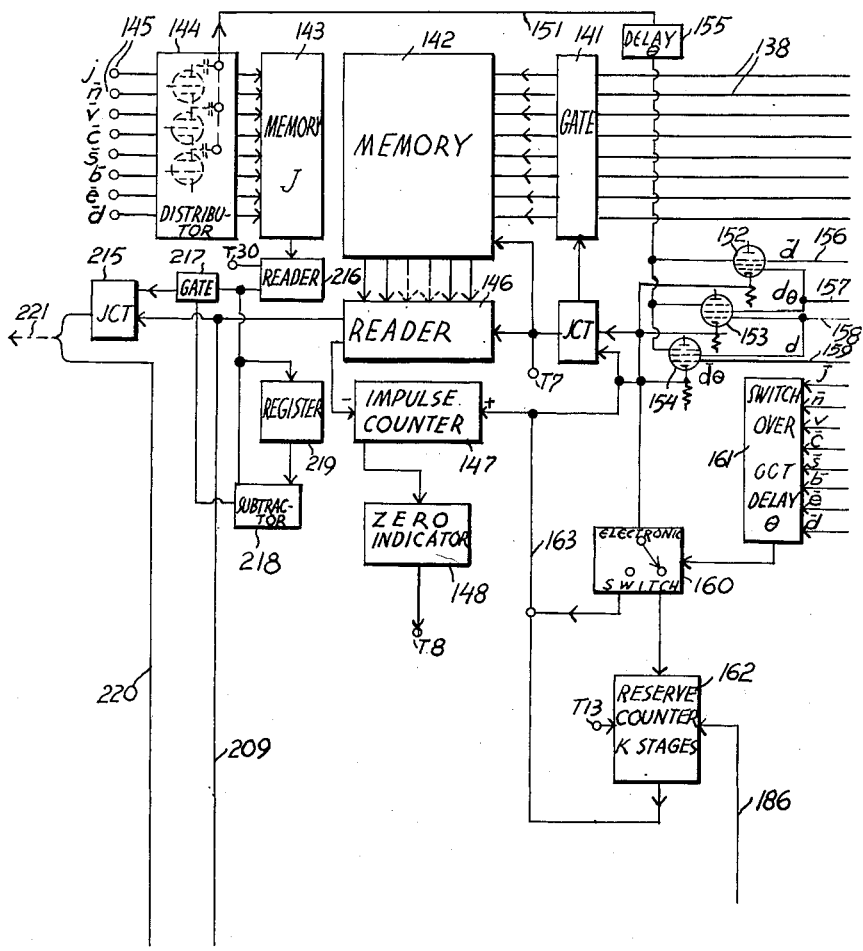
Figure 10D:
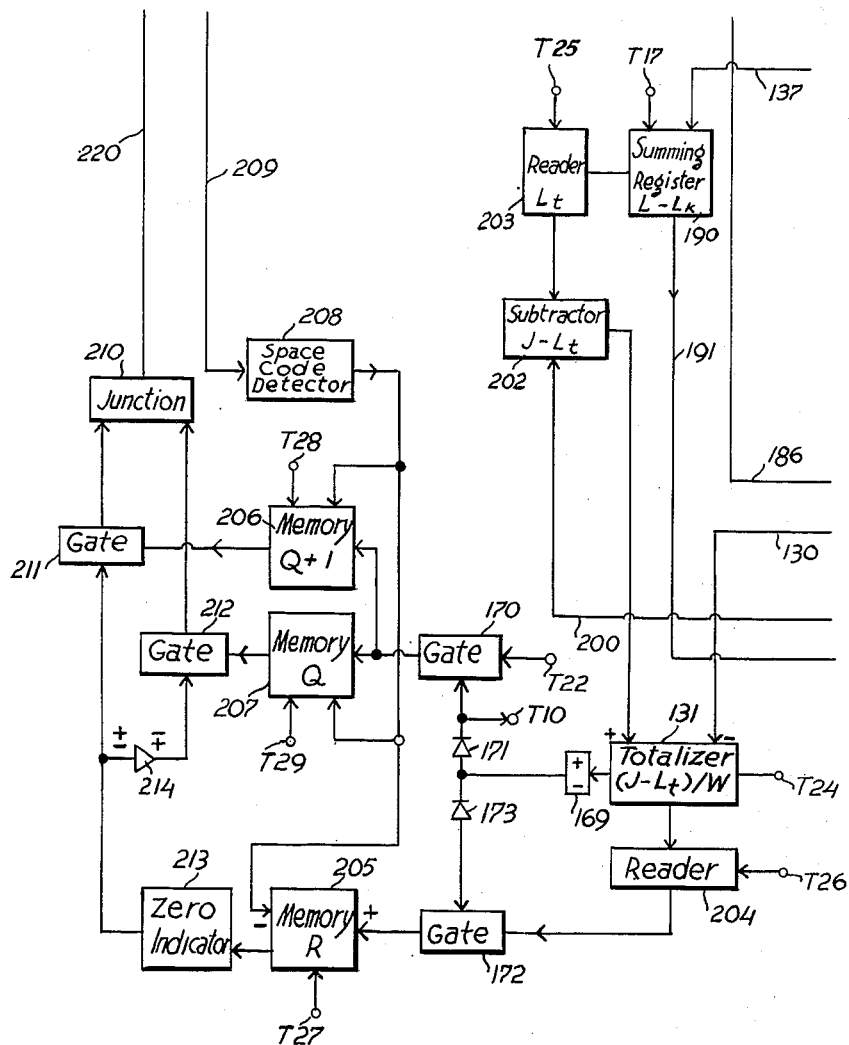

Upon comparison of the circuit arrangement of Figs. 10a–10d with the more generalized diagram of Fig. 6 it will be noted that distributor 150 corresponds to unit 52, memories 142 and 143 together are represented by unit 51, elements 141, 144 and associated circuits in Fig. 10c are the counterpart of unit 50, memory 205 corresponds to unit 54 and memories 206, 207 together are represented by unit 55; Fig. 10b and part s of Figs. 10a, 10c 10d together constitute that which in Fig. 6 has been identified as the evaluator 56.

The operation of the computer just described will now be explained, reference being also had to Fig. 11 in which the graphs T1–T36, 199, 28A and 29A illustrate the application of control voltages to the similarly designated terminals in Figs. 10a–10d as well as to the leads 199 (Fig. 10b) and 28A, 29A (Fig. 6). The direction of the arrowheads in the circuit diagrams indicate whether these voltages are transmitted from or toward the timer 38 (Fig. 6). The actual circuits for producing these voltages, while complex, are well known per se and need not be described in detail.

For the sake of simplicity, it will be assumed that only the pick-up head 21A is maintained operative by the selector 40, the operation of the computer being the same for the reading of the principal tape 1A or of the correction tape 1Z. The stepping pulses periodically applied to conductor 28A, at intervals $\theta$, cause the appearance of code signal combinations on terminals 115 and 145 as well as the terminals (not shown) within distributor 144 corresponding to terminals 86 in Fig. 8. It will be assumed that the pick-up head is scanning a line without indentation (in the middle of a paragraph) and that justification code J, previously transmitted, has been inscribed in memory 143 and also in register 118J which latter caused a voltage of appropriate magnitude to be registered as a positive value $+J$ in totalizer 166. Similarly, a variety code V is stored in register 118 and causes the continuous application of corresponding control voltages to weighting circuits 122 and 123.

Code combinations C and S, following one another in irregular succession to denote characters and spaces, are applied to registers 118C and 118S, respectively, on which they remain stored for a single unit interval only, the timer applying discharging pulses to terminals T1, T2, T3 and T4 at the same cadence 1/0 as to lead 28A. The weighted values of these characters and spaces are applied over lead 189 first to the register 187 which is filled up after the first K text elements are received; thereafter the values of the first text elements begin to accumulate in register 190, the register 187 continuing to withhold from register 190 the values of the last K text elements received as will be understood in the light of the description of the operation of a stepping register in conjunction with Fig. 9. If the sum total of the values transmitted over lead 189 is L, a small part $L_K$ will be inscribed in circuit 190. At the same time the total value L will have been transmitted to the negative input of totalizer 166 by way of junction 197, leaving within the totalizer the value $J-L$.

The code combinations arriving at terminals 115, except codes J and N as previously noted, were also transferred to memory unit 142. Whenever a code C or S passed into this unit, a counting impulse was applied in the previously described manner to counter 162 and, after the latter became filled, to counter 147. It will be remembered that all codes V are arranged to bypass counter 162, hence the latter's K stages have counted only the text elements (characters and spaces).

At the same time the actual code combinations corresponding to these text elements were transmitted by way of junction 119 to the register combination 188, 181. There being no further unit available to accept the overflow of these registers, such overflow is simply dissipated. Accordingly, whenever more than $K+2$ code combinations have passed through units 188, 181, register 188 contains the $K-2$ combinations last received and register 181 contains the four immediately preceding combinations. These latter four combinations are compared, successively or simultaneously, with a number of similar groups of code combinations representing prohibited character separations in accordance with the preceding table. Such comparison is prevented in the absence of suitable control impulses applied to circuit 177.

The above operations will continue as long as totalizer 166 registers a positive value. When this value becomes zero or negative (the latter occurrence being considerably more frequent), the equivalent of a negative pulse, shown in Fig. 11, is applied to terminal T9 by device 167. This pulse causes the application of a blocking potential to lead 29A (Fig. 6) by the timer, thereby rendering ineffective the continuing pulses at T1, T2, T3, T4 and 28A. Owing to the time delay $\theta$ in distributor 150, however, at last code will be registered on one of the registers 118C, 118V etc.

Meanwhile, the register 128 has counted W successive space codes forming part of the now terminated text sequence of length L. These spaces were weighted by circuit 123 with the increment $m$ so that the value $mW=M$ has been registered on adder 136 via lead 126. This value M was further augmented by the value $L-L_K$ applied over lead 137 to both the register 190 and the adder 136. Thus, unit 136 now registers a numerical value equal to $M+L-L_K$.

At this point the timer applies a reading impulse (or a suitable combination of such impulses) to terminals T6 and T19. Reader 132 responds and applies to a terminal of subtractor 134, via lead 133, the numerical value of code J registered in circuit 118J. Reader 194 also responds but, since its associated register 195 is empty, does not change the contents of either subtractor 134 or adder 192 connected to it. Subtractor 134 thereupon causes the value stored in totalizer 135 to be reduced by J, leaving a resultant value equal to $M+L-L_K-JM+D$ as previously defined.

Next, a train of K impulses is applied by the timer to terminal T12. If the registered difference $M-D$ is positive or zero, gate 175 remains blocked and these impulses are without effect. If, however, a negative value is indicated by detector 174, the first impulse is transmitted via conductor 184, junction 185 and leads 186, 186′, 186″ to counter 162 and registers 187, 188. Units 162, 187 and 181, 188 all take one step, whereby one impulse stored in counter 162 is transferred to counter 147, the numerical value stored in the stage of register 187 nearest its output is transferred to adder 136, thereby increasing the result of the computation of totalizer 135 by such value, as well as to register 190, and the first stage of register 188 is depleted while the group of code combinations stored in register 181 is changed. The output of sign discriminator 174 may still be negative, in which case the next stepping impulse is likewise passed by the gate 175 and advances the aforesaid registers and counters by another step. Finally, the magnitude of the output of totalizer 135 passes through zero and gate 175 is blocked; the number K should be so chosen that this occurs well before the train of stepping impulses is ended.

After the generation of stepping impulses has ceased, the timer applies successive test impulses to terminal T33. It will be assumed that at this instant a non-divisible combination of characters and spaces is stored in register 181, causing the comparator 177 to have a negative output which is translated by detector 178 into a control potential applied via junction 185 to leads 186, 186′ and 186″. The effect of this operation is the same as that of the transmission of a stepping impulse over lead 184; thus, counters 162, 147 and registers 187, 190, 188, 181 again take one step. If the code combinations now present in register 181 are again unsuitable for the termination of a line, the above operation is repeated. When a divisible group of text elements is reached, the end of the line termination test is indicated to the timer by a positive impulse on terminal T11.

Thereafter, a reading impulse is applied to terminals T6, T19, T25 and T34. Since the length of the reserve sequence stored in register 187 has by now been reduced from $L_K$ to $L_k$, register 190 contains a numerical value equal to $L-L_k=L_t$. The contents of register 195 are still zero, hence only the numerical value J is applied by reader 132 to subtractor 134 whence this value is transmitted through the now conductive gate 201 to subtractor 202, the latter thus establishing the difference $J-L_t$ which is applied to the positive terminal of totalizer 131. Following this operation, a reading impulse is impressed upon terminal T5 which transfers the value W from register 128 to the negative terminal of totalizer 131. This totalizer thereupon performs the first one of a series of successive subtractions of value W from the difference $J-L_t$, thereby carrying out the division $(J-L_t)/W$. After the first subtraction an impulse is applied to terminals T22 and T26; if the output of totalizer 131 has remained positive, detector 169 unblocks gate 170 and lets the impulse from terminal T22 pass into memory unit 206 and in parallel therewith into memory unit 207. It should be noted that unit 207, when reset to normal and before the application of any pulses thereto, has an output of zero whereas unit 206 under like conditions has an output of unity. After Q such impulses, therefore, units 206 and 207 register the values $Q+1$ and Q, respectively. It should be noted that the impulses applied to terminals T22 and T26 alternate with those applied to terminal T5.

In accordance with the definition of Q previously given, the output of totalizer 131 now goes to or through zero and a negative impulse is effectively applied by detector 169 to terminal T10, thereby informing the timer of the end of the division operation. Since gate 172 is now open while gate 170 is blocked, the final impulse on terminal T26 causes the reader 204 to transfer to memory unit 205 the value R stored at that time in totalizer 131. A reading impulse (or a suitable combination of such impulses) is thereupon applied to terminal T30 to determine whether a new justification code J has been registered in memory 143; if so, this code is applied to output channel 211 via the circuits 215–219 in the manner previously described. Next, a succession of reading impulses are applied to terminal T7 to step the multistage units 142 and 146. As the first code stored in memory 142 reaches the final or output stage, it is transmitted over channel 209 by the reader 146 which also applies a discharge pulse to counter 147. Thus, with each code combination leaving the memory unit 142 the impulse content of counter 147 is simultaneously reduced by one. When this impulse content reaches zero, indicator 148 applies a stopping pulse to terminal T8 which interrupts the generation of stepping pulses at terminal T7.

The code combinations transmitted over channel 209 include some space codes which are detected by circuit 208; the latter may be fundamentally similar to the code-responsive circuits 144 or 161 previously described. A count of these space codes is delivered to memories 205, 206 and 207 in the form of one impulse per code. In the case of unit 205 this counting impulse simply subtracts unity from the contents of its memory, as indicated by the minus sign; in the case of units 206 and 207 it operates as an enabling signal, causing each of these units to transmit the value stored therein ($Q+1$ and Q, respectively) toward junction 210 by way of the associated gate 211 or 212. As long as the output of memory unit 205 is greater than zero, the positive voltage applied by indicator 213 to gate 211 renders only the memory unit 206 effective, whereby during each of the first R counting pulses the quantity $Q+1$ is transmitted over multiple 221 whenever a space code from reader 146 is transmitted over other conductors of this multiple by way of junction 215. It will be understood that junction 215 may include suitable delay means to insure simultaneous arrival of both signals at the printer 64 (Fig. 6), the latter being thus enabled to interpret the signal from channel 220 as an order to modify the normal width of a space (as determined by the variety code V last transmitted) by adding to it a number of unit lengths equal to $Q+1$. In similar manner the gate 212, unblocked instead of gate 211 after the output of zero indicator 213 has changed to negative polarity, insures the application of quantity Q to channel 220 during each of the remaining $W-R$ counting pulses, the printer then increasing each space width by Q unit lengths. It will thus be seen that the total increase in space widths equals $R(Q+1)+(W-R)Q=(J-L_t)/W$, whereby the desired justification is in fact obtained.

When the end-of-justification signal has been applied by indicator 148 to terminal T8, the timer delivers a train of stepping pulses to terminals T17 and T18. With gate 193 thus unblocked, the contents $L-L_k$ of register 190 are thus transferred via adder 192 to the positive input of totalizer 166. After a number of such stepping pulses sufficient to empty the register 190 completely, a reading pulse is also applied to terminal T19, whereby the contents of register 195 are likewise communicated by way of circuits 192, 193 to the positive side of this totalizer. Since register 195 is empty as long as no end-of-paragraph code E has been received, the numerical value $J-L$ previously stored in totalizer 166 is increased by $L_t=L-L_k$ so that the final value so stored will be equal to $J-L_k$, i. e. the justification value less the length of the residual text elements still stored in memory 142. Subsequently, stepping pulses are received by terminals T13, T14, T15 and T16 whereby the contents of counter 162 are transferred to counter 147, the contents of register 187 are transferred to register 190, and the registers 188 and 181 are emptied. Resetting pulses are applied to terminals T20, T23, T24, T27, T28, T29 and T35, whereby register 195, register 128, totalizer 131, memories 205, 206, 207 and totalizer 135 are returned to zero. The timer thereupon lifts the blocking voltage on lead 29A and another cycle as just described is begun.

If during the next cycle there occurs an end-of-paragraph code E, a pulse appears in the output of register 118E and is communicated to the timer by way of terminal T32. This pulse immediately interrupts the admission of further code signals into the computer by applying a blocking potential to lead 29A. Because of the time delay involved, one additional code will enter the computer but, being the numerical code N of the next line, will be without further effect upon the circuits.

A series of impulses (shown positive in contradistinction to the preceding resetting pulses) are now applied, via terminal T36, to register 195 to determine the required number of end-of-line spaces. These impulses also reach the negative input of totalizer 166, via lead 199 and junction 197, and thus serve to reduce the quantity $J-L_e$, already stored therein, by the cumulative length $S_e$ of these end-of-line spaces. When the totalizer 166 goes to zero, discriminator 167 again delivers to terminal T9 a signal initiating the computations previously described.

It will be understood that the operations of totalizer 131 proceed as before but that, with the substitution of $L_e+S_e$ for $L_t$, the dividend registered in it will generally be zero, hence no signals will be delivered to channel 220 and the spaces within sequence $L_e$ will retain their normal length. Since subtractor 134 also deducts the value $S_e$ from the total registered in circuit 135, this total will practically always be negative and all K impulses from terminal T12 will be allowed to pass through gate 175 for a stepping and emptying of counter 162 and registers 187, 188 and 181. Comparator 177 will then remain functionless.

When the reading equipment is once again set in motion following the appearance of an end-of-reading pulse at terminal T8, a beginning-of-paragraph code B will be received by register 118B and will give rise to a pulse communicated to the timer via terminal T31. This causes the application of a blocking potential to lead 29A for a predetermined period during which a starting potential applied to memory 196, via terminal T21, causes this memory to transmit a predetermined number of impulses to register 195 and also, over lead 199 and junction 107, to the negative input of totalizer 166. These impulses define a succession of indentation spaces, of total length $S_b$, whereby the effective value of the justification J is reduced by $S_b$ and the length L is shortened to $L_b$ as previously defined. This length $L_b$ is reached when, following resumption of scanning, totalizer 166 is driven to zero or negative as before. Subtractor 134, controlled by reader 194, deducts $S_b$ from the value J as applied to totalizer 135, this being necessary since the effective justification value at this time is equal to $J-S_e$.

It will be understood that the change in the contents of register 195, representing a line indentation first at the end and then at the beginning of the paragraph, could also be controlled by the output of register 118E alone. For the actuation of the printer, however, it will be preferable to preface the line following an end-of-paragraph signal E with a separate beginning-of-paragraph signal B, hence the mode of operation just described is simpler. When the end-of-paragraph code E and the beginning-of-paragraph code B emerge from reader 146, they are transmitted over multiple 221 to control the printer according to their respective significance. It would be equally feasible to have these codes detected in the output of reader 146 by a device similar to circuit 208 which could then signal the timer to transmit an appropriate number of space signals to the printer, i. e. a fixed number in the case of code B and a number determined by the contents of register 195 in the case of code E.

In the foregoing description no consideration has been paid to the possibility that the reserve stquence $L_K$ may contain one or more space tending to falsify the result of the computation $(J-L_t)/W$. A similar difficulty would exist if code E should occur within that part of a sequence L which is included in the reserve $L_k$, i. e. if a paragraph is to be terminated close to the end of a normally justified line. Also, for complete accuracy it will be desirable to suppress the space at the end of a line terminated between words (taking into consideration the fact that the prohibition *Y/OY of the foregoing table prevents such space from appearing at the head of the line next following and, by reducing the reserve length $L_k$, shifts it onto the preceding line) and to make allowance for the provision of a hyphen where a line is terminated in the middle of a word. The system of Fig. 12, showing only the modified parts of the system of Figs. 10a–10d, is designed to provide the necessary corrections.

In Fig. 12 there is shown a memory unit 231, of K stages, inserted in a multiple 232 which branches off from multiple 138 between gate 141 and memory 142; memory 231 thus receives the same code combinations as are transmitted to memory 142. A memory unit 233, also of K stages, is inserted in the outputs of registers 118C and 118S so as to respond to only those code combinations (characters and spaces) which determine the numerical values L, $L_k$, $L_K$ and $L_t$. A space code detector 234S, which may be similar to unit 208, responds to only the codes S and applies them to the input of register 128 which determines the value W and which in Fig. 12 has been removed from the output of weighting circuit 123. Detector 234S and a register 235V, energized from memory 231, jointly control a weighting circuit 236 which establishes the magnitude of $m$ and supplies it to adder 136 for computation of the value $Wm=M$, adder 135 having been disconnected from weighting circuit 123. The output lead of register 235V, which is similar to register 118V in that it selectively responds to a variety code V and stores its value until the arrival of another such code, is shown at 240.

Memory units 231 and 233 may each be regarded as a multistage register of the type shown in Fig. 9, adapted to be stepped either by an incoming signal combination or by a control pulse; the latter is applied to these units over respective extensions of conductor 186 at the same time such pulse is effective to step the register 187, 188 (Fig. 10b) and the counter 162 (Fig. 10d). A condenser 230 in multiple 238, representative of several such condensers (one for each conductor of the multiple) which may form part of network 139 (Fig. 10c), prevents the steady potentials of the wires of this multiple from repetitively impressing the same code combination upon memories 142 and 231 when they are stepped in the arrested condition of the associated pick-up head.

Also connected to the output of memory 231 are two indentation code detectors 234B and 234E for the codes B and E, respectively. Detector 234B thus takes the place of register 118B in Fig. 10a and applies its output to terminal T31; detector 234E similarly takes the place of register 118E in Fig. 10a and applies its output to terminal T32.

The effect of the arrangement just described is that only the space codes S present in the operative text sequence $L_t$ will be considered in computing both values W and M, to the exclusion of space codes remaining within the reserve $L_k$, and that indentation codes B and E will become effective, in the manner hereinbefore described, only if occurring between elements of the said sequence $L_t$. The application of pulses to junction 185 from either comparator 177 or gate 175 (Fig. 10b) will advance memory units 231 and 233 in unison with units 162, 187, 188 and 181, but the emptying of these latter units by the control pulses subsequently applied to terminals T13–T16 will have no effect upon memories 231 and 233. Unit 231 consequently retains all the text and service informations remaining in memory 142 (Fig. 10c), and unit 233 similarly retains the equivalent of the residual sequence whose length $L_k$ is subtracted from the justification value J in totalizer 166 (Fig. 10b) and whose text elements are counted by the residual impulses in counter 147.

As further shown in Fig. 12, register 181 has its output connected to a second comparator 237, in parallel with comparator 177, which is also controlled by a storage unit 238 wherein a single group of code combinations Y–O–Y–* is stored, reference being had to the symbols used earlier in the table of prohibited divisions. When a like group appears in the register 181, comparator 237 when stepped from terminal T33 in parallel with comparator 177 applies an output signal to a weighting circuit 239; this circuit now transmits the positive terminal of totalizer 131 a numerical value equal to the combination of a space and a hyphen as weighted by the code stored in register 235V, the latter's output lead 240 being also connected to a control electrode of circuit 239. The action just described increases the dividend $J-L_t$ of the totalizer 131 (Fig. 10d) by a value sufficient to account for the suppression of the final space element actually received and for the omission of a terminal hyphen which would have to be added by the printer if the line had been broken off, instead, in the middle of a word.

In order to effect the aforementioned suppression of a space at the end of the line, there is provided a unity indicator 241 which is controlled from the next-to-last stage of impulse counter 147 in the same manner as zero indicator 148 is controlled from the last stage thereof; indicator 241 thus receives an actuating signal when a single impulse remains stored in counter 147. This indicator, however, remains inoperative unless simultaneously enabled by a signal from comparator 239 which, it is assumed, produces a negative output voltage on a lead 242 in the event of equality of its input voltage from circuits 181 and 238. This negative output voltage on lead 242 is then converted by an amplifier-inverter 243 into the enabling signal referred to. In order to insure coincidence between the activating voltages applied to indicator 241 from counter 147 and from inverter 243, a second control electrode of comparator 237 is connected via a lead 244 to the stepping terminal T7 associated with reader 146. Indicator 241 thereupon applies a blocking pulse to a gate 245 inserted in output channel 209 of reader 146. At the same time a memory unit 246 is actuated by the output of unit 241 to send an end-of-line signal to printer 64 (Fig. 6) via a lead 247.

When, on the other hand, the input voltages of comparator 237 are unequal, this circuit produces a positive voltage on lead 242 indicative of the fact that a word is being split at the end of a line. This positive voltage is applied to a memory unit 248 which, when simultaneously enabled by a control pulse issuing from zero indicator 148, transmits to the printer via a lead 249 a signal ordering the printing of the necessary hyphen at the end of the line. A signal on either of leads 247 and 249, which merge with lead 220 in multiple 221, thus informs the printer that a new line is to be started.

It will be understood that the circuit elements omitted in Fig. 12 are substantially the same as those shown in Figs. 10a–10d and that the remainder of the operational steps is essentially as described in connection with Fig. 11. Various modifications of the apparatus specifically disclosed are, of course, possible within the spirit and scope of the appended claims.

As will be apparent from the foregoing disclosure, the term "recording medium" employed in the claims embraces both a single carrier of coded entries (e. g. a perforated tape) and a plurality of such carriers.

What is claimed is:

1. A system for controlling the printing of texts, comprising a recording medium adapted to have entered thereon a series of text elements and service informations descriptive of the contents and the form of a message to be printed, said service informations including a justification entry determining the length of a printed line in at least part of said message, said text elements including a variety of weighted entries each having a predetermined number of unit lengths assigned to it, an automatic computer, reading means adapted and positioned to scan successive entries on said medium, discriminator means controlled by said reading means for detecting said justification entry and transmitting a corresponding length-of-line information to said computer, translator means controlled by said reading means for indicating said number of unit lengths to said computer in response to the scanning of said weighted entries, said computer including calculating means for progressively totaling said unit lengths of a train of text elements and comparing the total with a justification value derived from said length-of-line information, and output means controlled by said computer for producing an end-of-line signal in response to at least substantial equality within a predetermined margin of deviation, of said total and said justification value.

2. A system according to claim 1, further comprising recorder means for entering said text elements and service informations on said medium, said recorder means comprising keyboard-controlled apparatus including a first set of keys for said text elements and a second set of keys for said service informations.

3. A system according to claim 2, wherein said apparatus comprises first and second marking means jointly controlled by both of said sets of keys for simultaneously entering said text elements and service informations in coded form on said recording medium and in clear form on a monitoring blank.

4. A system according to claim 3, wherein said second marking means includes a first and a second set of type bars respectively controlled by said first and said second set of keys, said sets of type bars being positioned for striking respective portions of said monitoring blank.

5. A system according to claim 4, wherein said second marking means further includes a movable carriage for supporting said monitoring blank, said second set of keys including special key means not connected to any of said type bars but adapted to control the movement of said carriage.

6. A system according to claim 4, wherein said second marking means includes a special type bar for registering a hyphenation symbol on said monitoring blank, said apparatus including a special key for actuating said special type bar, said first marking means being independent of said special key.

7. A system according to claim 4, wherein said second set of type bars are adapted to register a variety of service symbols on a first portion of said monitoring blank, said first set of type bars being positioned to register on a second portion of said monitoring blank, remote from said first portion, a succession of text symbols uninterrupted by said service symbols.

8. A system according to claim 7, wherein said service symbols comprise multi-digit numbers, said second set of keys including special key means for transmitting to said first marking means a variety of interpretive signals along with said multi-digit numbers.

9. A system according to claim 1, further comprising recorder means for entering said text elements and service information on said medium, said recorder means including feed means for advancing said recording medium and registering means for entering on said recording medium a succession of symbols in the form of code combinations of marks disposed in rows parallel to and files transverse to the direction of advance of said medium, at least some of said code combinations extending over a plurality of said files.

10. A system according to claim 9, wherein said recorder means further comprises keyboard-controlled apparatus for entering at least said text elements on a monitoring blank and simultaneously controlling the registration of corresponding marks on said recording medium, said apparatus including special key means for intermittently advancing said recording medium by a plurality of files and repeatedly operating said registering means while entering a single character on said monitoring blank.

11. A system according to claim 1, wherein said recording medium comprises a first carrier of coded entries representing an original multi-line text and a second carrier of coded entries representing corrected versions of individual lines of said multi-line text, each line of said original text being preceded on said first carrier by a line-identifying symbol, each corrected line being preceded on said second carrier by a line-identifying symbol identical with that preceding the counterpart of such corrected line on said first carrier, said reading means comprising a first and a second pick-up device for respectively scanning said first and said second carrier, first and second feed means for respectively advancing said first and said second carrier, comparator means, first and second detector means transmitting to said comparator means respective signals representative of the line-identifying symbols preceding each line of text approaching said first and second pick-up devices, and selector means controlled by said comparator for activating only said first pick-up device in the case of non-identity of said line-identifying symbols and activating only said second pick-up device in the case of identity of said line-identifying symbols as read by said first and second detector means.

12. A system according to claim 11, wherein said corrected lines on said second carrier follow one another at uniform intervals irrespective of the relative spacing of corresponding lines on said first carrier, successive lines on said first carrier being identified by symbols translatable by said first detector means into an electrical variable of progressively changing magnitude, corresponding lines on said second carrier being identified by symbols translatable by said second detector means into equivalent electrical variables, said selector means including first blocking means for arresting said first feed means in response to equality of the outputs of said first and second detector means, second blocking means for arresting said second feed means in response to inequality of said outputs, and blanking means for suppressing the output of said first pick-up device immediately upon the re-starting of said first feed means and until the reading of a new line-identifying symbol by said first detector means.

13. A system according to claim 12, wherein said reading means further includes register means inserted between said comparator means and both of said detector means for storing the magnitudes of said electrical variables between reading of successive line-identifying symbols.

14. A system according to claim 1, further comprising recorder means for registering said text elements and service informations are registered on said medium in the form of coded entries comprising signal portions accompanied by flag portions, said entries being divided into classes identified by said flag portions, said discriminator means being part of an input stage having detector means responsive to said flag portions for transmitting said classes of entries over separate channels to said computer.

15. A system according to claim 14, wherein said classes include character entries, space entries and variety entries, said character and space entries together constituting said weighted entries and having their numerical significance co-determined by said variety entries, said translator means including weighting means connected to receive said character, space and variety entries from said detector means and to determine therefrom said number of unit lengths.

16. A system according to claim 15, wherein said translator means includes register means for storing an electrical variable representative of a detected variety entry until detection of the next variety entry.

17. A system according to claim 14, wherein said classes include space entries and character entries together constituting said weighted entries, said space entries representing word separations having a permissible range of variations beyond a predetermined minimum number of unit lengths, said calculating means being connected to receive from said translator means the said minimum number of unit lengths upon detection of any of said space entries and to compute said total from said minimum number of unit lengths and the number of unit lengths corresponding to each detected character entry, said computer comprising totalizer means controlled by said calculating means for marking the end of a train of text elements upon said total attaining an ultimate value L close to but not exceeding said justification value J, subtractor means for determining the difference $J-L=D$, if any, between said justification value and said ultimate value, and apportioning means controlled by said totalizer means for augmenting said minimum number of unit lengths of at least part of said word separations by increments adding up to a value equal to said difference D.

18. A system according to claim 17, wherein said apportioning means comprises counting means controlled by said detector means for determining the number W of space entries in said train of text elements, arithmetical means for determining the quotient Q and the remainder R, if any, of the division of said difference D by said number W, first loading means controlled by said arithmetical means for augmenting each one of R word separations in said train by a number of unit lengths equal to $Q+1$, and second loading means controlled by said arithmetical means for augmenting each one of the remaining $W-R$ word separations in said train by a number of unit lengths equal to Q.

19. A system according to claim 17, wherein a maximum increment beyond said minimum number of unit lengths is placed upon said permissible range of variations, said computer comprising counting means controlled by said detector means for determining the number W of space entries in said train of text elements, adding means controlled by said counting means for establishing the sum $M=MW$ of said maximum increments in said train of text elements, storage means for temporarily withholding a terminal portion of said train of text elements from said translator means, said terminal portion having a reserve length $L_K$ whereby said difference D is computed by subtracting from said justification value J the overall length L of said train diminished by said reserve length $L_K$, subtractor means controlled by said counting means and by said totalizer means for determining the difference $M-D$, and switching means controlled by said subtractor means for progressively transferring text elements from said storage means to said translator means in response to a negative difference $M-D$ and continuing such transfer until the last-mentioned difference is no longer negative.

20. A system according to claim 14, wherein said classes include identation entries indicating the beginning and the end of a paragraph, said computer comprising a signal source controled by said detector means for supplementing the total computed by said calculating means with a fixed number of unit lengths in response to a beginning-of-paragraph indication and supplementing said total with a variable number of unit lengths, sufficient to accomplish said at least substantial equality, in response to an end-of-paragraph indication.

21. A system according to claim 14, wherein said recorder means includes feed means for advancing said recording medium and registering means for entering on said recording medium a succession of symbols in the form of code combinations of marks disposed in rows parallel to and files transverse to the direction of advance of said medium, said flag portion comprising a mark in one of said files, said signal portion comprising at least one mark in a succeeding file.

22. A system according to claim 21, wherein the number of said rows is at least equal to the number of said classes, each of said flag portions comprising a mark in a respective one of said rows.

23. A system according to claim 21, wherein said code combinations include distinctive marks occurring in a particular one of said rows in certain of said classes and missing in other of said classes, said input stage including register means for temporarily storing said text elements and service informations, pending determination of said total by said calculating means, and suppressor means responsive to said distinctive marks for barring at least one of said classes of entries from said register means.

24. A system according to claim 23, wherein said entries include numerical codes representing a provisional numbering of the lines of said message, said suppressor means being arranged to bar said numerical codes from said register means.

25. A system according to claim 23, wherein said input stage comprises a signal generator responsive to said distinctive marks, delay means connected in the output of said generator, and control means for said suppressor means connected to the output of said signal generator means directly and by way of said delay means, said delay means having a delay time substantially equal to the time required by said reading means to pass from one of said files to another, said control means thereby determining the admissibility of an entry to said register means from the presence or absence or said distinctive marks in a plurality of said files.

26. A system according to claim 1, wherein said text elements occur in combinations of which some are separable and some are inseparable according to pre-established rules, said computer comprising totalizer means controlled by said calculating means for provisionally marking the end of a train of text elements upon said total attaining an ultimate value L approaching said justification value J, test means controlled by said reading means and by said totalizer means for determining the separability of a combination occurring at the provisional end of said train, and switching means controlled by said test means for shifting said end of said train until a separable combination occurs thereat.

27. A system according to claim 26, wherein said test means comprises memory means having stored therein an array of said inseparable combinations and comparison means responsive to the output of said reading means and of said memory means.

28. A system according to claim 26, wherein said computer comprises storage means for temporarily withholding a terminal portion of said train of text elements from said translator means, said terminal portion having a reserve length $L_K$, said totalizer means being arranged to actuate said test means upon the difference $J-L$ approaching zero, $L_K$ being substantially smaller than J, said switching means being adapted to transfer successive text elements from said storage means to said translator means in response to an inseparability signal from said test means.

29. A system according to claim 26, wherein said test means comprises memory means having stored therein a variety of said combinations, comparison means responsive to the output of said reading means and of said memory means, and circuit means controlled by said comparison means for respectively producing an actuating signal for said switching means, a space-suppressing signal and a hyphenation signal in response to different outputs of said comparison means.

30. In a composing plant adapted to control a text printer, in combination, a recording medium carrying entries representing a succession of text elements, justification means presettable to indicate the desired length of a line of text to be printed from said elements, reading means adapted to scan successive ones of said entries, arithmetical means controlled by said reading means for computing the tentative length of a sequence of text elements scanned, totalizer means controlled by said justification means and by said arithmetical means for provisionally marking the end of said sequence, test means controlled by said reading means for establishing certain predetermined characteristics of said sequence, thereby ascertaining the terminability of said sequence at said provisionally marked end in accordance with pre-existing rules, and switching means for shifting said end of said sequence until a properly terminable sequence is obtained.

31. The combination according to claim 30, wherein said reading means comprises a pick-up device, feed means for advancing said recording medium past said pick-up device, storage means for retaining said sequence during operation of said switching means, output means controlled by said switching means for transferring the retained sequence from said storage means to said printer, and feed-control means responsive to said totalizer means and to said output means for arresting said feed means during ascertainment of terminability and transfer of said sequence to said printer.

32. The combination according to claim 31, wherein said storage means comprises an auxiliary stepping register adapted to retain a terminal portion of a succession of text elements scanned by said reading means and a principal stepping register adapted to receive the overflow of said auxiliary register, said auxiliary register and said principal register being controlled by said totalizer means for respectively accumulating a reserve sequence of text elements and a principal sequence of text elements having a combined length L not greater than said desired length J, said auxiliary register having a number of stages sufficient to store a reserve sequence of a length $L_K$ representing a small fraction of said desired length J, said switching means being adapted to transfer successive text elements from said auxiliary register to said principal register.

33. The combination according to claim 32, wherein each of said text elements has an individual length equal to a predetermined number of unit lengths, said output means including a source of impulses controlled by said reading means for producing an invariable number of counting impulses for each of said text elements, an auxiliary counter adapted to store a number of said counting impulses proportional to the number of text elements retained in said auxiliary register, and a principal counter adapted to receive the overflow of said auxiliary counter and to store a number of said counting impulses proportional to the number of text elements accumulated in said principal register, said switching means being connected to said auxiliary counter for stepping the latter in unison with said auxiliary register, thereby transferring to said principal counter a number of counting impulses proportional to the number of text elements transferred to said principal register, said output means including a generator of an end-of-line signal for said text printer responsive to the contents of said principal counter.

34. The combination according to claim 33, wherein the length of a terminable sequence ultimately retained in said principal register is $L_t$ and the length of the residual reserve sequence remaining in said auxiliary register is $L_k = L - L_t$, $L_k$ having a value between zero and $L_K$ inclusive, said terminable sequence including a number W of spaces occurring between word-forming characters, said totalizer means being responsive to the contents of both of said registers for determining the difference $D = J - L_t$, said output means including calculating means for apportioning said difference D among said W spaces, thereby enabling said text printer to convert said terminable sequence into a printed line having said desired length J.

35. The combination according to claim 34, wherein said medium also carries additional entries representing elements of service information accompanying said text elements, said storage means comprising a memory unit connected to receive both said text elements and said service elements from said reading means, said source of impulses being controlled by said reading means for producing additional counting impulses for said service elements and being provided with shunting means for applying said additional counting impulses directly to said principal counter while bypassing said auxiliary counter.

36. The combination according to claim 35, wherein said output means includes stepping means for advancing said principal counter and said memory unit in unison, thereby progressively emptying said principal counter and feeding the contents of said memory unit to said printer, said generator being controlled to produce said end-of-line signal substantially concurrently with the discharge of the last of said counting impulses from said principal counter, and control means operative in response to the discharge of said last counting impulses for arresting said stepping means.

37. The combination according to claim 36, wherein said output means includes other stepping means, responsive to the operation of said control means, for transferring the contents of said principal register to said totalizer in such manner as to deduct said residual length $L_k$ from said desired length J and for subsequently transferring the contents of said auxiliary register and of said auxiliary counter to said principal register and to said principal counter, respectively.

38. In a composing plant adapted to control a text printer, in combination, a first pick-up device, a first carrier of entries representing the text of a multi-line message to be printed, said entries including a succession of numerical codes identifying successive lines of said message, a second pick-up device, a second carrier of entries representing corrected versions of defective individual lines of said message each identified by a numerical code identical with the code accompanying the defective counterpart of such corrected line on said first carrier, first and second feed means for advancing said first and said second carrier past said first and said second pick-up device, respectively, said pick-up devices being provided with output means for translating the entries scanned thereby into signals interpretable by said printer, first and second detector means responsive to said numerical codes on said first and said second carrier, respectively, and adapted to translate said numerical codes into characteristic signals, comparator means connected to receive said characteristic signals from both of said detector means, and selector means controlled by said comparator means for activating only said first pick-up device in the case of non-identity of said characteristic signals received and for activating only said second pick-up device in the case of signal identity, thereby actuating said output means to produce signals representing a message wherein said corrected lines replace said defective lines.

39. A method of justifying a line of printed text consisting of a series of word-forming characters separated by spaces, each of said spaces having a permissible length variable between a predetermined minimum and a predetermined maximum, the difference between said maximum and said minimum being $m$, said characters when added to said minimum length of all of said spaces having a cumulative length L not greater than a desired justification value J, which comprises removing enough characters and spaces from the end of said series to a reserve to reduce the said length L thereof by a value $L_K$, determining the value $M = mW$, W being the number of spaces in the so foreshortened series, forming the difference $M - D$ where $D = J - (L - L_K)$ and, upon observing said difference to be of negative sign, transferring enough characters and spaces from said reserve to said series to eliminate said negative sign, thereupon dividing the resulting value of W into the resulting value of D, thereby obtaining a quotient Q and a remainder R, augmenting a number R of said spaces by respective increments each equal to $Q+1$, and augmenting the remaining $W-R$ spaces by respective increments each equal to Q.

40. A method of justifying a line of printed text consisting of a series of word-forming characters separated by spaces, each of said spaces having a permissive length variable beyond a predetermined minimum, said characters when added to said minimum length of all of said spaces having a cumulative length L not greater than a desired justification value J, which comprises removing enough characters and spaces from the end of said series to a reserve to reduce the said length L thereof by a value $L_K$, determining the terminability of the so foreshortened series in accordance with grammatical rules and, upon ascertaining an improper line termination, progressively transferring characters and spaces from said reserve to said series until arriving at a proper termination, thereby obtaining a terminable series of length $L-L_k$ whereby $L_k$ has a value less than $L_K$, determining the difference $D=J-(L-L_k)$, thereupon dividing the number W of said spaces in said terminable series into D, thereby obtaining a quotient Q and a remainder R, augmenting a number R of said spaces by respective increments each equal to $Q+1$, and augmenting the remaining $W-R$ spaces by respective increments each equal to Q.

41. A method of justifying a line of printed text consisting of a series of word-forming characters separated by spaces, each of said spaces having a permissible length variable between a predetermined minimum and a predetermined maximum, the difference between said maximum and said minimum being $m$, said characters when added to said minimum length of all of said spaces having a cumulative length L not greater than a desired justification value J, which comprises removing enough characters and spaces from the end of said series to a reserve to reduce the said length L thereof by a value $L_K$, determining the value $M=mW$, W being the number of spaces in the so foreshortened series, forming the difference $M-D$ where $D=J-(L-L_K)$ and, upon observing said difference to be of negative sign, transferring enough characters and spaces from said reserve to said series to eliminate said negative sign, determining the terminability of the foreshortened series thus obtained in accordance with grammatical rules and, upon ascertaining an improper line termination, progressively transferring further characters and spaces from said reserve to said series until arriving at a proper termination, thereby obtaining a terminable series of length $L-L_k$ where $L_k$ has a value less than $L_K$, thereupon dividing the resulting value of W into the resulting value of D, thereby obtaining a quotient Q and a remainder R, augmenting a number R of said spaces by respective increments each equal to $Q+1$, and augmenting the remaining $W-R$ spaces by respective increments each equal to Q.

References Cited in the file of this patent

UNITED STATES PATENTS

| | | |
|---|---|---|
| 1,466,491 | Schaffer | Aug. 28, 1923 |
| 1,480,919 | Walker | Jan. 15, 1924 |
| 1,656,106 | Egli | Jan. 10, 1928 |
| 1,669,932 | Egli | May 15, 1928 |
| 2,201,140 | Kingsbury | May 21, 1940 |
| 2,287,793 | Goetz | June 30, 1942 |
| 2,294,385 | Colman | Sept. 1, 1942 |
| 2,375,135 | Reynolds | May 1, 1945 |
| 2,699,859 | Caldwell | Jan. 18, 1955 |
| 2,703,715 | Macomic | Mar. 8, 1955 |

OTHER REFERENCES

Legros and Grant: Typographical Printing Surfaces (publication), published by Longmans, Green & Co. (1916), pages 364–365 only. (Copy in Div. 17.)